US012681905B2

(12) United States Patent
Fujikawa et al.

(10) Patent No.: US 12,681,905 B2
(45) Date of Patent: Jul. 14, 2026

(54) IMAGE READING APPARATUS AND DATA COMMUNICATION SYSTEM

(71) Applicant: KYOCERA Document Solutions Inc., Osaka (JP)

(72) Inventors: Takuma Fujikawa, Osaka (JP); Nobushiro Fujiwara, Osaka (JP); Shingo Ito, Kyoto (JP)

(73) Assignee: KYOCERA Document Solutions Inc., Osaka (JP)

( * ) Notice: Subject to any disclaimer, the term of this patent is extended or adjusted under 35 U.S.C. 154(b) by 21 days.

(21) Appl. No.: 18/692,246

(22) PCT Filed: Sep. 16, 2022

(86) PCT No.: PCT/JP2022/034707
§ 371 (c)(1),
(2) Date: Mar. 14, 2024

(87) PCT Pub. No.: WO2023/042903
PCT Pub. Date: Mar. 23, 2023

(65) Prior Publication Data
US 2025/0004994 A1      Jan. 2, 2025

(30) Foreign Application Priority Data
Sep. 17, 2021    (JP) ................................ 2021-152571

(51) Int. Cl.
| *G06F 7/00* | (2006.01) |
| *G06F 16/185* | (2019.01) |
| *G06F 17/00* | (2019.01) |
| *H04N 1/00* | (2006.01) |

(52) U.S. Cl.
CPC ....... *G06F 16/185* (2019.01); *H04N 1/00708* (2013.01)

(58) Field of Classification Search
CPC .......................... G06F 16/185; H04N 1/00708
USPC ......................................................... 707/829
See application file for complete search history.

(56) References Cited

U.S. PATENT DOCUMENTS

| 7,557,943 | B2 * | 7/2009 | Shibata | .............. | H04N 1/32101 |
| | | | | | 358/448 |
| 10,819,875 | B2 * | 10/2020 | Nakano | ................. | H04N 1/121 |
| 2003/0189652 | A1 * | 10/2003 | Takayama | ............ | G11B 27/105 |
| | | | | | 348/222.1 |

(Continued)

FOREIGN PATENT DOCUMENTS

| JP | 2001296622 A | 10/2001 |
| JP | 2007306383 A | 11/2007 |

(Continued)

*Primary Examiner* — Pavan Mamillapalli
(74) *Attorney, Agent, or Firm* — IP Business Solutions, LLC.

(57)      ABSTRACT

An image reading apparatus includes a reading device generating scan data by reading a sheet, and a communication device capable of communicating with a data management apparatus managing a plurality of folders including a shared folder in a hierarchical structure. The communication device transmits the scan data and folder designation information designating the shared folder from the plurality of folders managed in the hierarchical structure by the data management apparatus to the data management apparatus.

10 Claims, 18 Drawing Sheets

(56) References Cited

U.S. PATENT DOCUMENTS

| | | | | |
|---|---|---|---|---|
| 2004/0205286 | A1* | 10/2004 | Bryant | H04N 5/772 |
| | | | | 386/E5.072 |
| 2005/0018055 | A1* | 1/2005 | Cheng | G06F 16/51 |
| | | | | 707/E17.031 |
| 2005/0024513 | A1* | 2/2005 | Hayashi | G06F 16/51 |
| | | | | 707/E17.026 |
| 2009/0190163 | A1* | 7/2009 | Sato | H04N 1/4426 |
| | | | | 358/1.15 |
| 2011/0085198 | A1* | 4/2011 | Son | H04N 1/40 |
| | | | | 358/448 |
| 2015/0326743 | A1* | 11/2015 | Yabuuchi | H04N 1/00779 |
| | | | | 358/498 |
| 2017/0308019 | A1* | 10/2017 | Nishino | G03G 15/5062 |
| 2018/0063347 | A1* | 3/2018 | Conlon | H04N 1/00737 |
| 2025/0379951 | A1* | 12/2025 | Hamada | H04N 1/00822 |

FOREIGN PATENT DOCUMENTS

| | | | |
|---|---|---|---|
| JP | 2008005023 | A | 1/2008 |
| JP | 2013027028 | A | 2/2013 |
| JP | 2013042436 | A | 2/2013 |
| JP | 2015169971 | A | 9/2015 |

* cited by examiner

IMAGE READING APPARATUS AND DATA COMMUNICATION SYSTEM

TECHNICAL FIELD

The present invention relates to an image reading apparatus and a data communication system.

BACKGROUND ART

Sharing of scan data can be achieved by transmitting scan data obtained by reading paper using a scanner to a server on a cloud and receiving scan data at a remote place from the cloud. For example, it is known that scanned information is authenticated when a cloud service of a printer is used (refer to Patent Literature 1).

Patent Literature 1 discloses an authentication system in which answer sheets of examinees are read using a scanner, scanned information is transmitted to a server on a cloud, a corrector at a remote place receives the scanned information from the cloud, and the answer sheets are printed. The authentication system of Patent Literature 1 provides a mechanism through which an examination can be taken remotely by causing a server apparatus to authenticate the validity of scanned information on the basis of a time from printing to scanning.

CITATION LIST

Patent Literature

[Patent Literature 1]
Japanese Unexamined Patent Application Publication No. 2015-169971

SUMMARY OF INVENTION

However, in the authentication system of Patent Literature 1, the server apparatus (cloud) does not store scanned information hierarchically. For this reason, it may not be able to easily search for scanned information on the server apparatus (cloud).

The present invention has been made in consideration of the foregoing problems, and an object thereof is to provide an image reading apparatus and a data communication system capable of simply storing scan data in a shared folder in a plurality of folders managed in a hierarchical structure.

An image reading apparatus according to an aspect of the present invention includes a reading device generating scan data by reading a sheet, and a communication device capable of communicating with a data management apparatus managing a plurality of folders including a shared folder in a hierarchical structure. The communication device transmits the scan data and folder designation information designating the shared folder from the plurality of folders managed in the hierarchical structure in the data management apparatus to the data management apparatus.

A data communication system according to another aspect of the present invention includes the image reading apparatus described above, and an information processing terminal capable of communicating with the communication device of the image reading apparatus. The information processing terminal transmits folder designation information designating a folder, of folders of a hierarchical structure of the data management apparatus, for storing the scan data to the image reading apparatus, and the image reading apparatus transmits the folder designation information and the scan data to the data management apparatus such that the data management apparatus stores the scan data in a folder designated in the folder designation information on the basis of the folder designation information.

Advantageous Effects of Invention

According to the present invention, it is possible to simply store scan data in a shared folder in a plurality of folders managed in a hierarchical structure.

DESCRIPTION OF EMBODIMENT

Hereinafter, an embodiment of an image reading apparatus and a data communication system according to the present invention will be described with reference to the drawings. In the diagrams, the same reference signs are applied to parts which are the same or corresponding, and description will not be repeated.

Figure 1:
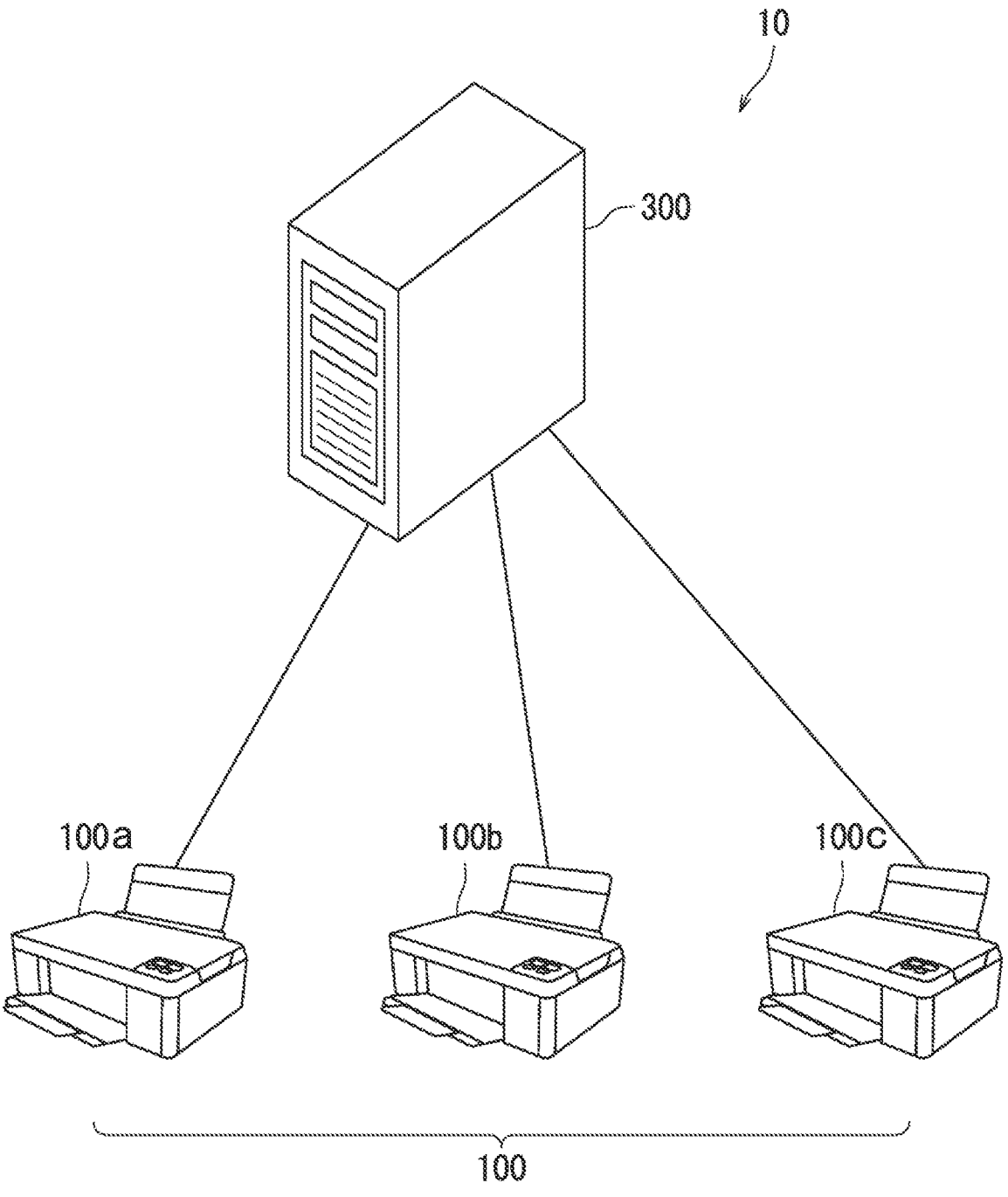
FIG. 1 is a schematic view of a data communication system including image reading apparatuses of the present embodiment.

First, with reference to FIG. 1, a constitution of a data communication system 10 including image reading apparatuses 100 of the present embodiment will be described. FIG. 1 is a schematic view of the data communication system 10 including the image reading apparatuses 100.

In the present embodiment, the data communication system 10 includes a plurality of image reading apparatuses 100. Here, the image reading apparatus 100 includes an image reading apparatus 100a, an image reading apparatus 100b, and an image reading apparatus 100c. In this specification, the image reading apparatuses 100a to 100c may be generically described as the image reading apparatuses 100. The image reading apparatus 100 communicates with a data management apparatus 300. The image reading apparatus 100 operates in association with the data management apparatus 300. The data communication system 10 may include the data management apparatus 300.

The image reading apparatus 100 generates scan data by reading (scanning) a sheet. In the present embodiment, for example, the image reading apparatus 100 is a scanner or a multi-function machine. The image reading apparatus 100 may have a function of a facsimile.

The image reading apparatus 100 communicates with the data management apparatus 300. In the data communication system 10, the image reading apparatus 100 and the data management apparatus 300 are connected to each other via a network. For example, the image reading apparatus 100 and the data management apparatus 300 are connected to each other via the Internet, a local area network (LAN), or a wide area network (WAN) such that communication can be performed therebetween.

The data management apparatus 300 manages data. For example, the data management apparatus 300 receives scan data from the image reading apparatus 100 and manages the scan data. The data management apparatus 300 is a so-called server. The data management apparatus 300 may be a cloud server. In addition, the data management apparatus 300 may transmit data to the image reading apparatus 100. For example, the data management apparatus 300 may transmit scan data received from a certain image reading apparatus 100 to another image reading apparatus 100.

The image reading apparatus 100 may have a function of forming an image. In this case, the image reading apparatus 100 forms an image on a sheet. In the present embodiment, for example, the image reading apparatus 100 is a printer, a copying machine, or a multi-function machine. For example, the image reading apparatus 100 forms an image on a sheet by an inkjet method. Alternatively, the image reading apparatus 100 may form an image on a sheet by an electrophotographic method.

Figure 2:
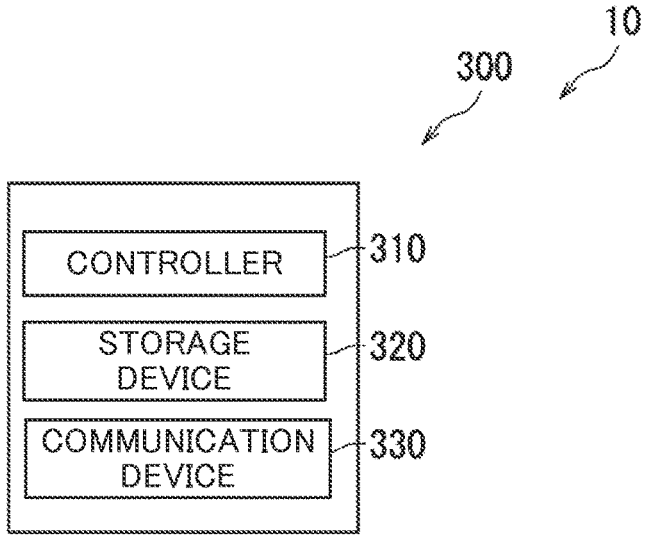
FIG. 2 is a block diagram of the data communication system including the image reading apparatuses of the present embodiment.
Figure 2:
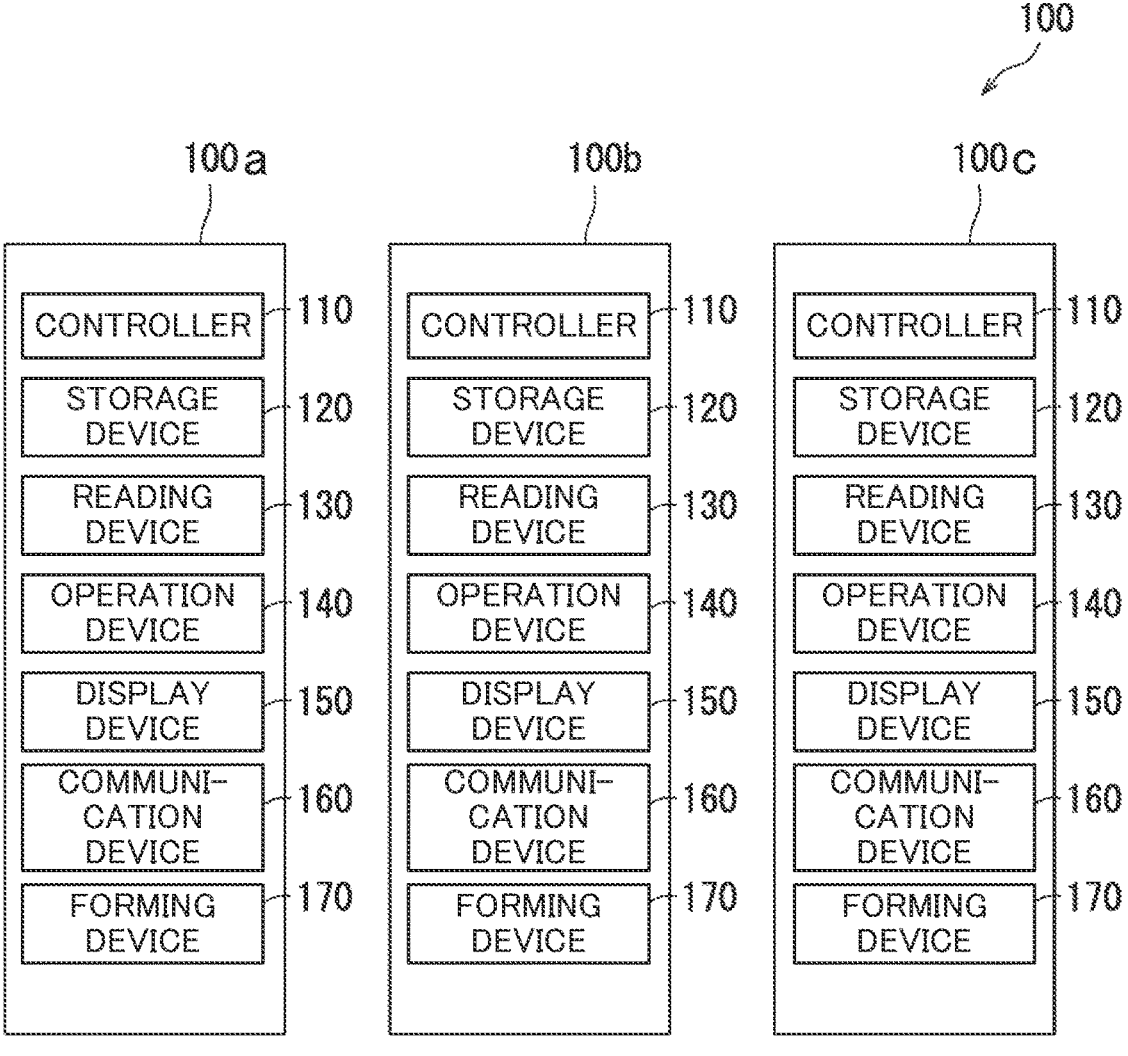

Next, with reference to FIGS. 1 and 2, a constitution of the data communication system 10 will be described. FIG. 2 is a block diagram of the data communication system 10.

As shown in FIG. 2, the data communication system 10 includes a plurality of image reading apparatuses 100. As described above, the image reading apparatus 100 communicates with the data management apparatus 300. In addition to the plurality of image reading apparatuses 100, the data communication system 10 may include the data management apparatus 300.

The image reading apparatus 100 includes a controller 110, a storage device 120, a reading device 130, an operation device 140, a display device 150, and a communication device 160. The controller 110 controls the storage device 120, the reading device 130, the operation device 140, the display device 150, and the communication device 160.

The controller 110 includes a computing element. The computing element includes a processor. As an example, the processor includes a central processing unit (CPU).

The storage device 120 stores data and computer programs. The storage device 120 includes a storage element. The storage device 120 includes a main storage element such as a semiconductor memory, and an auxiliary storage element such as a semiconductor memory and/or a hard disk drive. The storage device 120 may include a removable medium. The processor of the controller 110 controls the constituents of the image reading apparatus 100 by executing the computer program stored in the storage element of the storage device 120.

For example, the computer program is stored in a non-transitory computer readable storage medium. Examples of the non-transitory computer readable storage medium include a read only memory (ROM), a random access memory (RAM), a CD-ROM, a magnetic tape, a magnetic disk, and an optical data storage apparatus.

The reading device 130 is a scanner including a contact image sensor (CIS), a charge coupled device (CCD), and the like. The reading device 130 generates scan data by reading a sheet. For example, the sheet is plain paper, recycled paper, thin paper, cardboard, or coated paper. The storage device 120 stores scan data generated in the reading device 130.

The operation device 140 receives an instruction of an operator. The operation device 140 includes buttons or a keyboard. Alternatively, the operation device 140 may include a touch sensor. The operation device 140 outputs a signal indicating an instruction corresponding to operation of the buttons, the keyboard, or the touch panel to the controller 110 or the like.

The display device 150 displays an operation screen or results of various kinds of processing. When the reading device 130 generates scan data by reading a sheet, the display device 150 may display the scan data.

The display device 150 includes a liquid crystal display (LCD), an organic electro-luminescence (EL) display, or a plasma display. The operation device 140 and the display device 150 may be integrated together in a touch panel.

For example, the communication device 160 includes a network interface and communicates with external equipment. For example, the communication device 160 communicates with the data management apparatus 300. The communication device 160 transmits scan data to the data management apparatus 300. In addition, the communication device 160 receives image data from the data management apparatus 300.

The image reading apparatus 100 may further have a forming device 170. For example, the forming device 170 is an inkjet-type image forming mechanism including an inkjet head or is an electrophotographic-type image forming mechanism including a photoreceptor drum, an electrification apparatus, an exposure apparatus, a developing apparatus, a transfer apparatus, an anchoring apparatus, and the like. The forming device 170 forms an image on a sheet in accordance with image data. The forming device 170 may form an image on a sheet using a toner. Alternatively, the forming device 170 may form an image on a sheet using an ink. For example, the sheet is plain paper, recycled paper, thin paper, cardboard, or coated paper.

The display device 150 displays an image in accordance with image data. For this reason, the operator can visually recognize image data before the forming device 170 forms an image on a sheet.

The data management apparatus 300 has a controller 310, a storage device 320, and a communication device 330. The controller 310 controls the storage device 320 and the communication device 330.

The controller 310 includes a computing element. The computing element includes a processor. As an example, the processor includes a central processing unit (CPU). The processor may include an application specific integrated circuit (ASIC).

The storage device 320 stores various kinds of data. For example, the storage device 320 stores a control program. For example, the storage device 320 includes a main storage element such as a semiconductor memory, and an auxiliary storage element such as a semiconductor memory and/or a hard disk drive. The controller 310 controls computation of the data management apparatus 300 by executing the control program. Specifically, the processor of the controller 310 controls the constituents of the data management apparatus 300 by executing the computer program stored in the storage element of the storage device 320.

For example, the computer program is stored in a non-transitory computer readable storage medium. Examples of the non-transitory computer readable storage medium include a read only memory (ROM), a random access memory (RAM), a CD-ROM, a magnetic tape, a magnetic disk, and an optical data storage apparatus.

The storage device 320 stores a plurality of folders. The storage device 320 stores a plurality of folders managed in a hierarchical structure. At least some of the plurality of folders are shared folders. The shared folders are shared by a plurality of image reading apparatuses 100. A hierarchical structure for managing a plurality of folders in the storage device 320 may be changed as necessary.

For example, the shared folders are used for storing scan data generated in the image reading apparatuses 100. As an example, a shared folder stores scan data generated in the image reading apparatus 100a. In addition, the same shared folder stores scan data generated in the image reading apparatus 100b or the image reading apparatus 100c.

For example, the communication device 330 includes a network interface and communicates with external equipment. Here, the communication device 330 receives data from at least the image reading apparatus 100. In this case, the storage device 320 stores received data. In addition, the communication device 330 transmits data to at least the image reading apparatus 100. In this case, the communication device 330 transmits data read from the storage device 320 to the image reading apparatus 100.

For example, scan data generated in the image reading apparatus 100a is received via the communication device 330 and is stored in the shared folder. Similarly, scan data generated in the image reading apparatus 100b or the image reading apparatus 100c is received via the communication device 330 and is stored in the shared folder.

Figure 3:
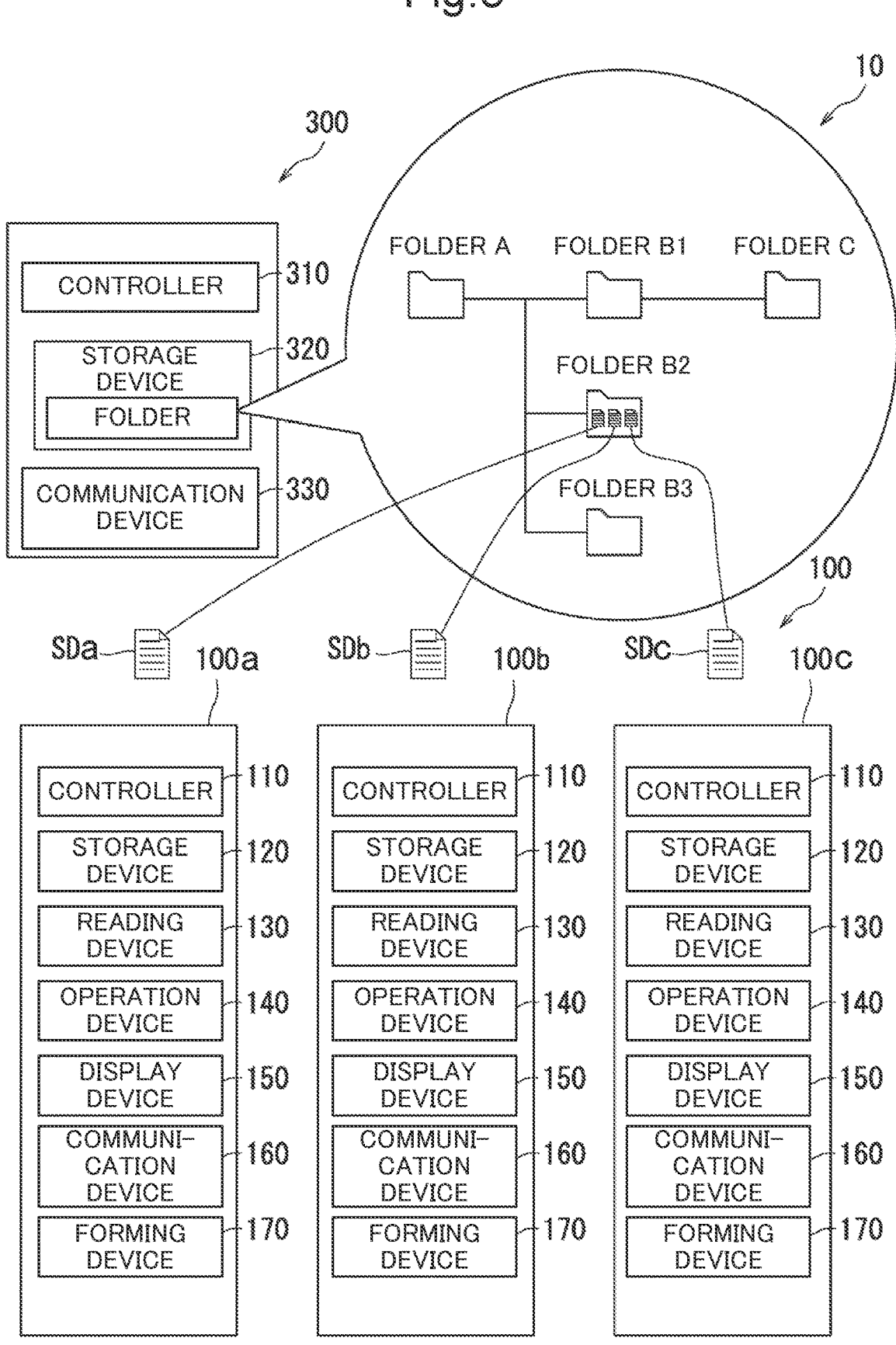
FIG. 3 is a schematic explanatory view of uploading of scan data on a shared folder in the data communication system of the present embodiment.
Figure 4:
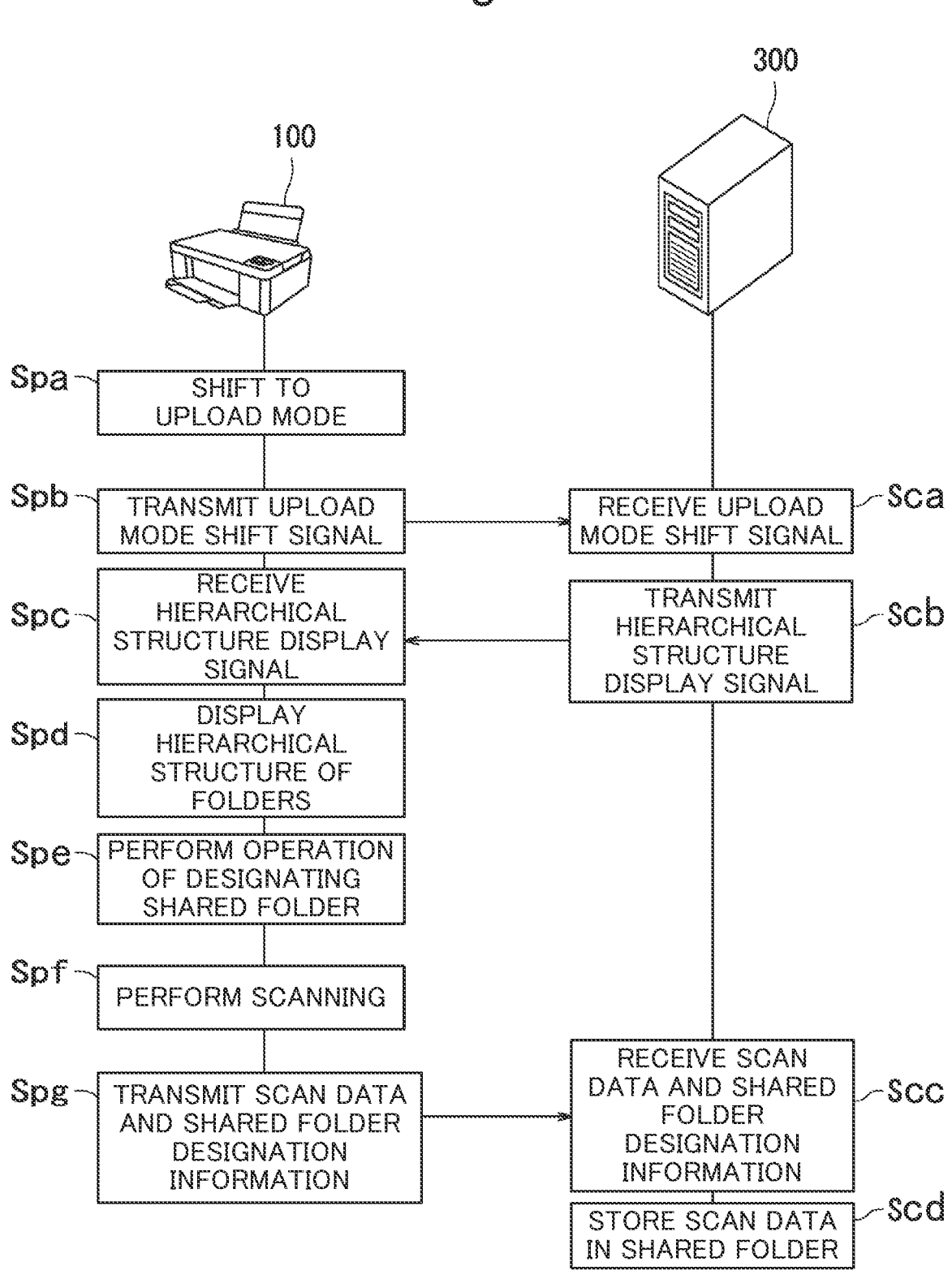
FIG. 4 is a flowchart of uploading of scan data on the shared folder in the data communication system of the present embodiment.
Figure 5:
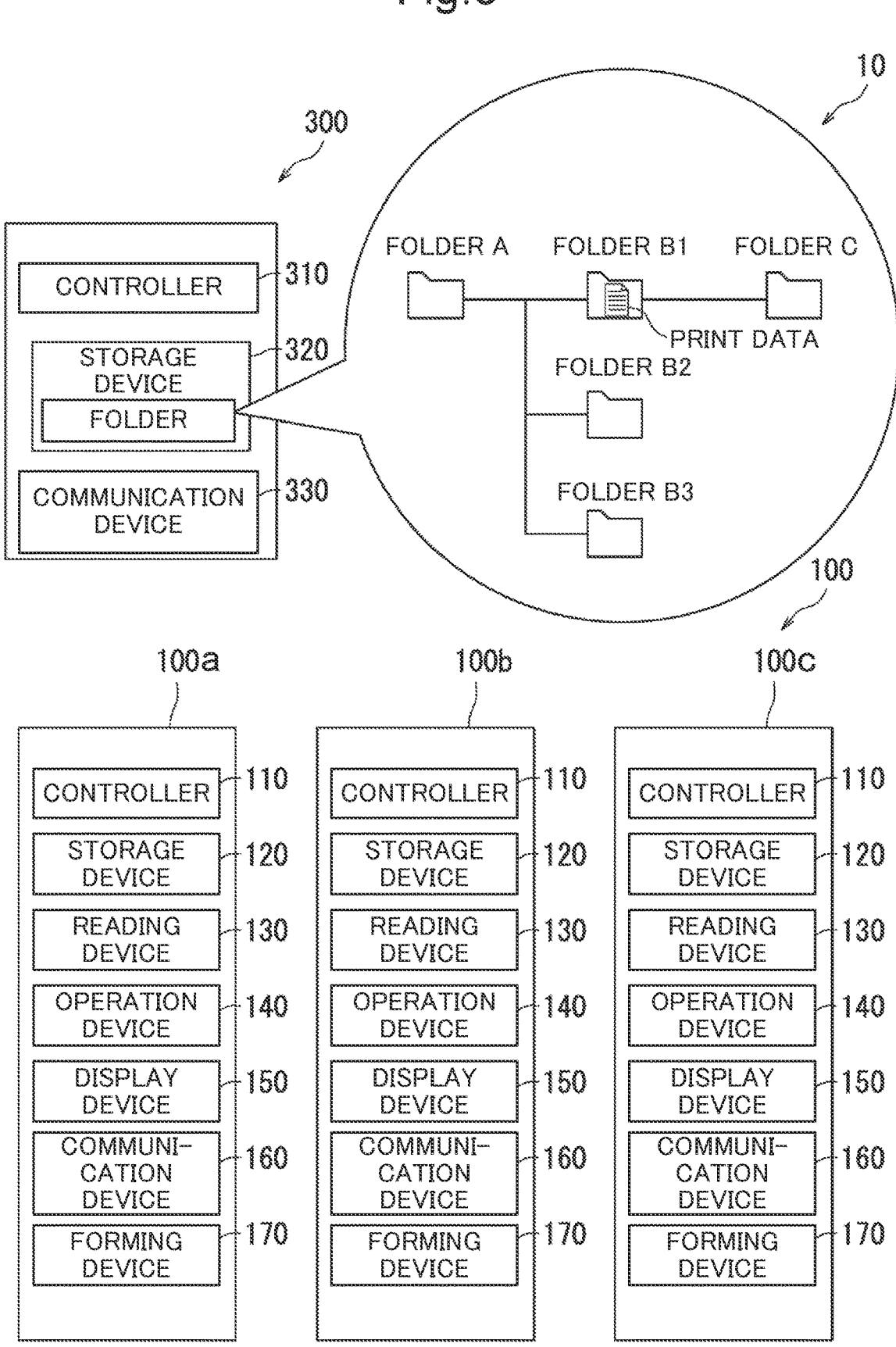
FIG. 5 is a schematic explanatory view of downloading of print data from the shared folder in the data communication system of the present embodiment.
Figure 6:
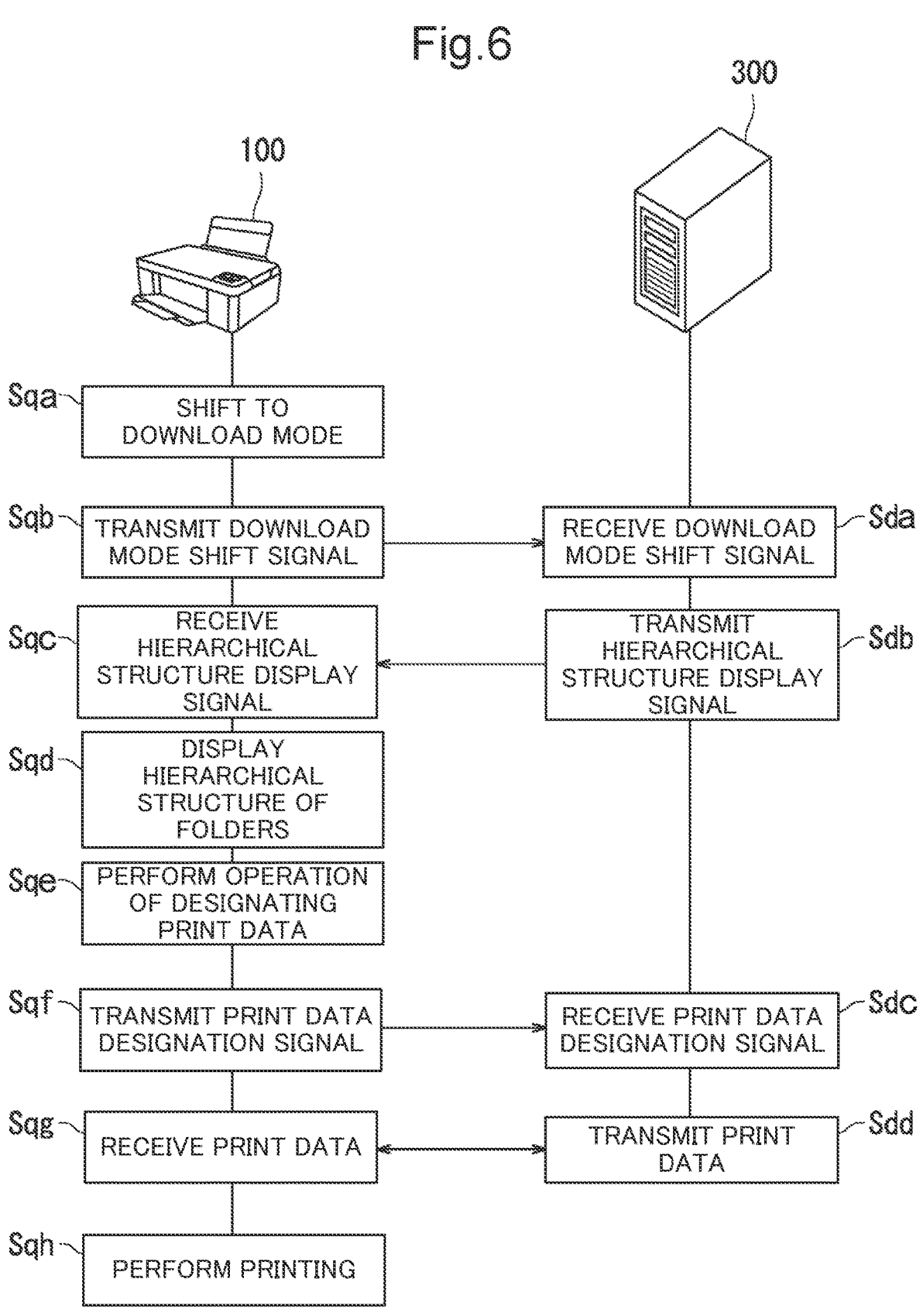
FIG. 6 is a flowchart of downloading of print data from the shared folder in the data communication system of the present embodiment.

Next, with reference to FIGS. 1 to 6, uploading of scan data and downloading of print data in the data communication system 10 including the image reading apparatuses 100 of the present embodiment will be described. FIG. 3 is a schematic explanatory view of uploading of scan data in the data communication system 10 including the image reading apparatuses 100 of the present embodiment, and FIG. 4 is a flowchart showing uploading of scan data in the data communication system 10 including the image reading apparatuses 100 of the present embodiment. FIG. 5 is a schematic explanatory view of downloading of print data in the data communication system 10 including the image reading apparatuses 100 of the present embodiment, and FIG. 6 is a flowchart showing downloading of print data in the data communication system 10 including the image reading apparatuses 100 of the present embodiment.

First, with reference to FIG. 3, uploading of scan data in the data communication system 10 including the image reading apparatuses 100 of the present embodiment will be described.

In the data management apparatus 300, the storage device 320 stores a plurality of folders managed in a hierarchical structure. Here, in the hierarchical structure of folders, a folder A is in a superior level, and folders B1 to B3 are included in the folder A. Here, at least the folder B1 and the folder B2 are shared folders. Moreover, a folder C is included in the folder B1. For example, in the image reading apparatus 100, the shared folder B2 is designated as a shared folder for storing scan data.

The image reading apparatus 100 transmits scan data to the data management apparatus 300. The image reading apparatus 100 designates a shared folder for storing scan data before the scan data is transmitted to the data management apparatus 300. For example, when scan data is scheduled to be stored in the shared folder B2 in the data management apparatus 300, the image reading apparatus 100 designates a shared folder for storing the scan data before the scan data is transmitted to the data management apparatus 300.

The image reading apparatus 100 displays the hierarchical structure of folders of the data management apparatus 300. Typically, the display device 150 displays the hierarchical structure of folders of the data management apparatus 300 in accordance with an instruction of the operator. In this case, the image reading apparatus 100 receives a hierarchical structure display signal indicating the hierarchical structure of folders of the data management apparatus 300 from the data management apparatus 300. The display device 150 displays the hierarchical structure of folders of the data management apparatus 300 in accordance with a hierarchical structure display signal.

While the display device 150 displays the hierarchical structure of folders of the data management apparatus 300, the operation device 140 receives an operation of the operator designating a shared folder for storing scan data in the hierarchical structure of folders displayed in the display device 150. Thereafter, the image reading apparatus 100 transmits shared folder designation information designating a shared folder for storing scan data to the data management apparatus 300. The shared folder for storing scan data may be designated before the scan data is generated or may be designated after the scan data is generated.

The image reading apparatus 100 generates scan data by reading a sheet. The image reading apparatus 100 transmits shared folder designation information and scan data to the data management apparatus 300.

The data management apparatus 300 receives shared folder designation information and scan data from the image reading apparatus 100. The data management apparatus 300 stores scan data in the shared folder designated in shared folder designation information.

For example, the image reading apparatus 100a generates scan data SDa by reading a sheet. The image reading apparatus 100a transmits shared folder designation information designating the shared folder B2 and the scan data SDa to the data management apparatus 300. The data management apparatus 300 receives shared folder designation information and the scan data SDa from the image reading apparatus 100a. The data management apparatus 300 stores the scan data SDa in the shared folder B2 designated in shared folder designation information.

In addition, the image reading apparatus 100b generates scan data SDb by reading a sheet. The image reading apparatus 100b transmits shared folder designation information designating the shared folder B2 and the scan data SDb to the data management apparatus 300. The data management apparatus 300 receives shared folder designation information and the scan data SDb from the image reading apparatus 100b. The data management apparatus 300 stores the scan data SDb in the shared folder B2 designated in shared folder designation information.

Similarly, the image reading apparatus 100c generates scan data SDc by reading a sheet. The image reading apparatus 100c transmits shared folder designation information designating the shared folder B2 and the scan data SDc to the data management apparatus 300. The data management apparatus 300 receives shared folder designation information and the scan data SDc from the image reading apparatus 100c. The data management apparatus 300 stores the scan data SDc in the shared folder B2 designated in shared folder designation information.

In this manner, the scan data SDa, the scan data SDb, and the scan data SDc of the image reading apparatuses 100a to 100c can be stored in the shared folder B2 of the storage device 320 in the data management apparatus 300.

In the image reading apparatus 100 of the present embodiment, a shared folder for storing scan data can be simply designated. A shared folder for storing scan data can be simply designated by designating a shared folder for storing scan data in the data management apparatus 300 using the operation device 140 and the display device 150 of the image reading apparatus 100.

Next, with reference to FIGS. 1 to 4, uploading of scan data in the image reading apparatus 100 of the present embodiment will be described. The image reading apparatus 100 uploads scan data on a shared folder of the hierarchical structure of folders of the data management apparatus 300. In the data management apparatus 300, a plurality of folders are managed in a hierarchical structure in the storage device 320. Here, in the hierarchical structure of folders, the folders B1 to B3 are in a subordinate level of the folder A and are included in the folder A. Moreover, the folder C is in a subordinate level of the folder B1 and is included in the folder B1. Here, target scan data is stored in the folder B2.

As shown in FIG. 4, in Step Spa, the image reading apparatus 100 receives an upload mode shift operation. Specifically, if the operation device 140 receives an upload mode shift operation of the operator for a shift to an upload mode, the controller 110 shifts to the upload mode.

In Step Spb, the image reading apparatus 100 transmits an upload mode shift signal indicating a shift to the upload mode to the data management apparatus 300. Specifically, if the controller 110 shifts to the upload mode, the communication device 160 transmits an upload mode shift signal to the data management apparatus 300.

In Step Sca, the data management apparatus 300 receives an upload mode shift signal from the image reading apparatus 100. Specifically, the communication device 330 receives an upload mode shift signal from the image reading apparatus 100.

In Step Scb, the data management apparatus 300 transmits a hierarchical structure display signal indicating the hierarchical structure of folders in the storage device 320 to the image reading apparatus 100. Specifically, the communication device 330 transmits a hierarchical structure display signal to the image reading apparatus 100.

In Step Spc, the image reading apparatus 100 receives a hierarchical structure display signal from the data management apparatus 300. Specifically, the communication device 160 receives a hierarchical structure display signal from the data management apparatus 300.

In Step Spd, the image reading apparatus 100 displays the hierarchical structure of folders in the storage device 320 in accordance with a hierarchical structure display signal. Specifically, the display device 150 displays the hierarchical structure of folders of the data management apparatus 300 in accordance with a hierarchical structure display signal. Typically, if the operation device 140 receives an operation of the operator, the display device 150 displays the hierarchical structure of folders of the data management apparatus 300.

In Step Spe, the image reading apparatus 100 receives an operation of designating a shared folder, of the folders in the storage device 320, for storing scan data. Typically, the operation device 140 receives an operation of the operator designating a shared folder for storing scan data in the hierarchical structure of folders.

In Step Spf, the image reading apparatus 100 scans a sheet. Specifically, the operation device 140 receives an operation of the operator executing scanning of a sheet, and then, the reading device 130 generates scan data by scanning a sheet. As necessary, the storage device 120 may store scan data.

In Step Spg, the image reading apparatus 100 transmits scan data and shared folder designation information to the data management apparatus 300. Specifically, the communication device 160 transmits scan data and shared folder designation information to the data management apparatus 300.

In Step Scc, the data management apparatus 300 receives scan data and shared folder designation information from the image reading apparatus 100. Specifically, the communication device 330 receives scan data and shared folder designation information from the image reading apparatus 100.

In Step Scd, the data management apparatus 300 stores scan data in the shared folder designated in shared folder designation information. Specifically, the controller 310 identifies the shared folder designated in shared folder designation information and stores scan data in the identified shared folder.

According to the image reading apparatus 100 of the present embodiment, a shared folder for storing scan data can be simply designated. For this reason, the image reading apparatus 100 can upload scan data on a predetermined shared folder of the data management apparatus 300.

With reference to FIGS. 3 and 4, a form of uploading scan data of the image reading apparatus 100 in the data communication system 10 on the data management apparatus 300 has been described, but data of the data management apparatus 300 in the data communication system 10 may be downloaded to the image reading apparatus 100. In this case, it is preferable for the image reading apparatus 100 to form an image in accordance with data transmitted from the data management apparatus 300.

Next, with reference to FIG. 5, downloading of data in the data communication system 10 including the image reading apparatuses 100 of the present embodiment will be described.

In the data management apparatus 300, a plurality of folders are managed in a hierarchical structure in the storage device 320. Here, in the hierarchical structure of folders, the folders B1 to B3 are in a subordinate level of the folder A and are included in the folder A. Moreover, the folder C is in a subordinate level of the folder B1 and is included in the folder B1. For example, target print data is stored in the folder B1.

In the image reading apparatus 100, the display device 150 displays the hierarchical structure of folders of the data management apparatus 300. Typically, the hierarchical structure of folders of the data management apparatus 300 is displayed in the display device 150 in accordance with an operation of the operator. The image reading apparatus 100 receives a hierarchical structure display signal from the data management apparatus 300 indicating the hierarchical structure of folders in the storage device 320.

If the operator designates print data included in the folder B1 as data to be read from the hierarchical structure of folders of the data management apparatus 300 displayed in the display device 150, the operation device 140 receives an operation of designating print data included in the folder B1 in the hierarchical structure of folders. Thereafter, the communication device 160 transmits a print data designation signal for designating print data to the image reading apparatus 100. The communication device 330 receives a print data designation signal from the image reading apparatus 100.

The controller 310 reads print data in a predetermined folder indicated by a print data designation signal from the storage device 320, and the communication device 330 transmits the print data to the communication device 160. The communication device 160 receives print data from the data management apparatus 300. The forming device 170 forms an image on a sheet in accordance with print data.

Next, with reference to FIGS. 5 and 6, downloading of print data in the data communication system 10 including the image reading apparatuses 100 of the present embodiment will be described.

As shown in FIG. 6, in Step Sqa, the image reading apparatus 100 receives a download mode shift operation. Typically, if the operation device 140 receives a download mode shift operation of the operator for a shift to a download mode, the controller 110 shifts to the download mode.

In Step Sqb, the image reading apparatus 100 transmits a download mode shift signal indicating a shift to the download mode to the data management apparatus 300. Specifically, the communication device 160 transmits a download mode shift signal to the data management apparatus 300.

In Step Sda, the data management apparatus 300 receives a download mode shift signal from the image reading apparatus 100. In the data management apparatus 300, a plurality of folders are managed in a hierarchical structure in the storage device 320. Here, in the hierarchical structure of folders, the folders B1 to B3 are in a subordinate level of the folder A and are included in the folder A. Moreover, the folder C is in a subordinate level of the folder B1 and is included in the folder B1. For example, the target print data is stored in the folder B1.

In Step Sdb, the data management apparatus 300 transmits a hierarchical structure display signal indicating the hierarchical structure of folders in the storage device 320 to the image reading apparatus 100. Specifically, the communication device 330 transmits a hierarchical structure display signal to the image reading apparatus 100.

In Step Sqc, the image reading apparatus 100 receives a hierarchical structure display signal from the data management apparatus 300. Specifically, the communication device

160 receives a hierarchical structure display signal from the data management apparatus 300.

In Step Sqd, the image reading apparatus 100 displays the hierarchical structure of folders in the storage device 320 in accordance with a hierarchical structure display signal. Specifically, the display device 150 displays the hierarchical structure of folders of the data management apparatus 300 in accordance with a hierarchical structure display signal. Typically, if the operation device 140 receives an operation of the operator, the display device 150 displays the hierarchical structure of folders of the data management apparatus 300.

In Step Sqe, the image reading apparatus 100 receives an operation of designating print data stored in the hierarchical structure of folders in the storage device 320. Typically, the operation device 140 receives an operation of designating print data from a particular shared folder of the hierarchical structure of folders.

In Step Sqf, the image reading apparatus 100 transmits a print data designation signal for designating print data stored in the shared folder to the data management apparatus 300. Specifically, the communication device 160 transmits a print data designation signal to the data management apparatus 300.

In Step Sdc, the data management apparatus 300 receives a print data designation signal from the image reading apparatus 100. Specifically, the communication device 330 receives a print data designation signal from the image reading apparatus 100.

In Step Sdd, the data management apparatus 300 transmits print data designated in a print data designation signal to the image reading apparatus 100. Specifically, in folders of the storage device 320, the controller 310 identifies the shared folder including print data designated in a print data designation signal and reads the print data from the identified shared folder. The communication device 330 transmits print data to the image reading apparatus 100.

In Step Sqg, the image reading apparatus 100 receives print data from the data management apparatus 300. Specifically, the communication device 160 receives print data from the data management apparatus 300.

In Step Sqh, the image reading apparatus 100 forms an image on a sheet in accordance with print data. Specifically, the forming device 170 forms an image on a sheet in accordance with print data.

In the image reading apparatus 100 of the present embodiment, print data can be downloaded from a predetermined shared folder of the data management apparatus 300, and an image can be formed on a sheet in accordance with the print data.

In the image reading apparatus 100, the size of a sheet to be scanned may be designated. Alternatively, scan data stored in the shared folder may have a designated image size.

Figure 7:
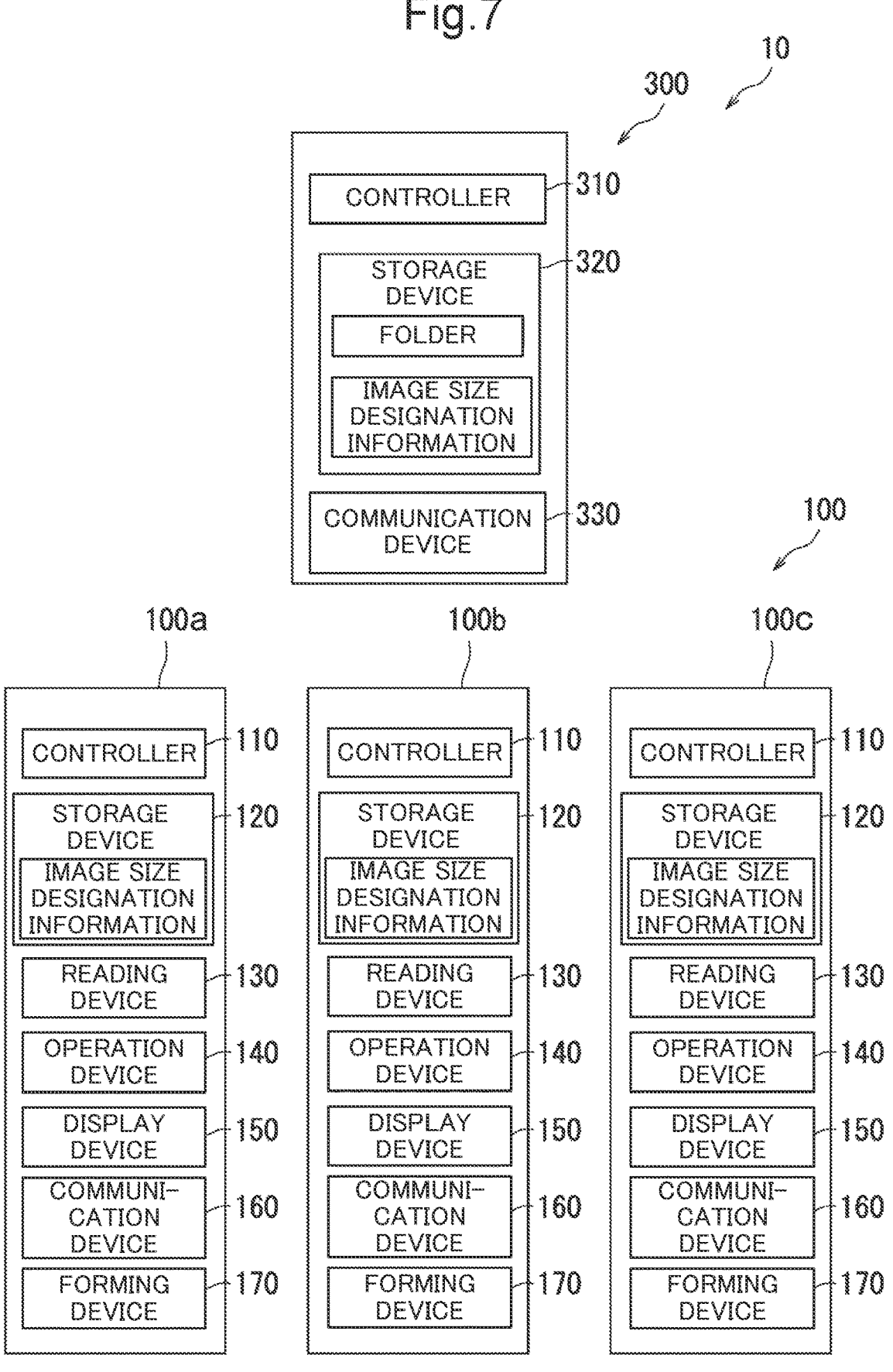
FIG. 7 is a block diagram of the data communication system including the image reading apparatuses of the present embodiment.

Next, with reference to FIG. 7, a constitution of the data communication system 10 will be described. FIG. 7 is a block diagram of the data communication system 10. The data communication system 10 in FIG. 7 has a constitution similar to that of the data communication system 10 in FIG. 2 except that the storage device 120 of the image reading apparatus 100 and the storage device 320 of the data management apparatus 300 store image size designation information designating the size of an image, and duplicate description will be omitted for the purpose of avoiding redundancy.

As shown in FIG. 7, in the data management apparatus 300, the storage device 320 stores image size designation information. In addition, in the image reading apparatus 100, the storage device 120 stores image size designation information. Image size designation information designates a sheet size when scan data stored in the shared folder is printed.

The image reading apparatus 100 may limit the size of a sheet to be scanned by the reading device 130 in accordance with image size designation information under the control of the controller 110. For example, when the size of a sheet scheduled to be scanned differs from the size designated in image size designation information, the reading device 130 may not scan the sheet and the display device 150 may display that the size of the sheet differs. The controller 110 performs control, such as causing the reading device 130 to read only a sheet having the sheet size designated by image size designation information. In this case, for example, when the hierarchical structure display signal is transmitted to the image reading apparatus 100, the data management apparatus 300 transmits, together with this, image size designation information from the communication device 330 to the image reading apparatus 100.

Alternatively, the image reading apparatus 100 may limit the size of scan data generated by scanning a sheet in accordance with image size designation information under the control of the controller 110. When the size of a sheet scheduled to be scanned differs from the size designated in image size designation information, the controller 110 may process scan data such that the image size of the scan data becomes the size designated in the image size designation information. For example, the controller 110 converts data generated by causing the reading device 130 to read a sheet into data including the image size designated by image size designation information.

Alternatively, the data management apparatus 300 may limit the size of scan data received from the image reading apparatus 100 in accordance with image size designation information. For example, when the size of scan data transmitted from the image reading apparatus 100 to the data management apparatus 300 differs from the size designated in image size designation information, the data management apparatus 300 may discard scan data without storing it. Alternatively, the data management apparatus 300 may change the size of scan data in accordance with image size designation information after scan data is received from the image reading apparatus 100.

In this manner, image size designation information may be used in either the image reading apparatus 100 or the data management apparatus 300. For this reason, at least one of the storage device 120 of the image reading apparatus 100 and the storage device 320 of the data management apparatus 300 may store image size designation information designating the size of an image. For example, image size designation information may be stored in the data management apparatus 300 and be transmitted from the data management apparatus 300 to the image reading apparatus 100.

As described above, the image reading apparatus 100 transmits folder designation information and scan data to the data management apparatus 300. However, the operator may erroneously designate a folder for storing scan data. In this case, it is preferable to be able to notify the operator of a probability that the folder has been erroneously designated in the data communication system 10.

Figure 8:
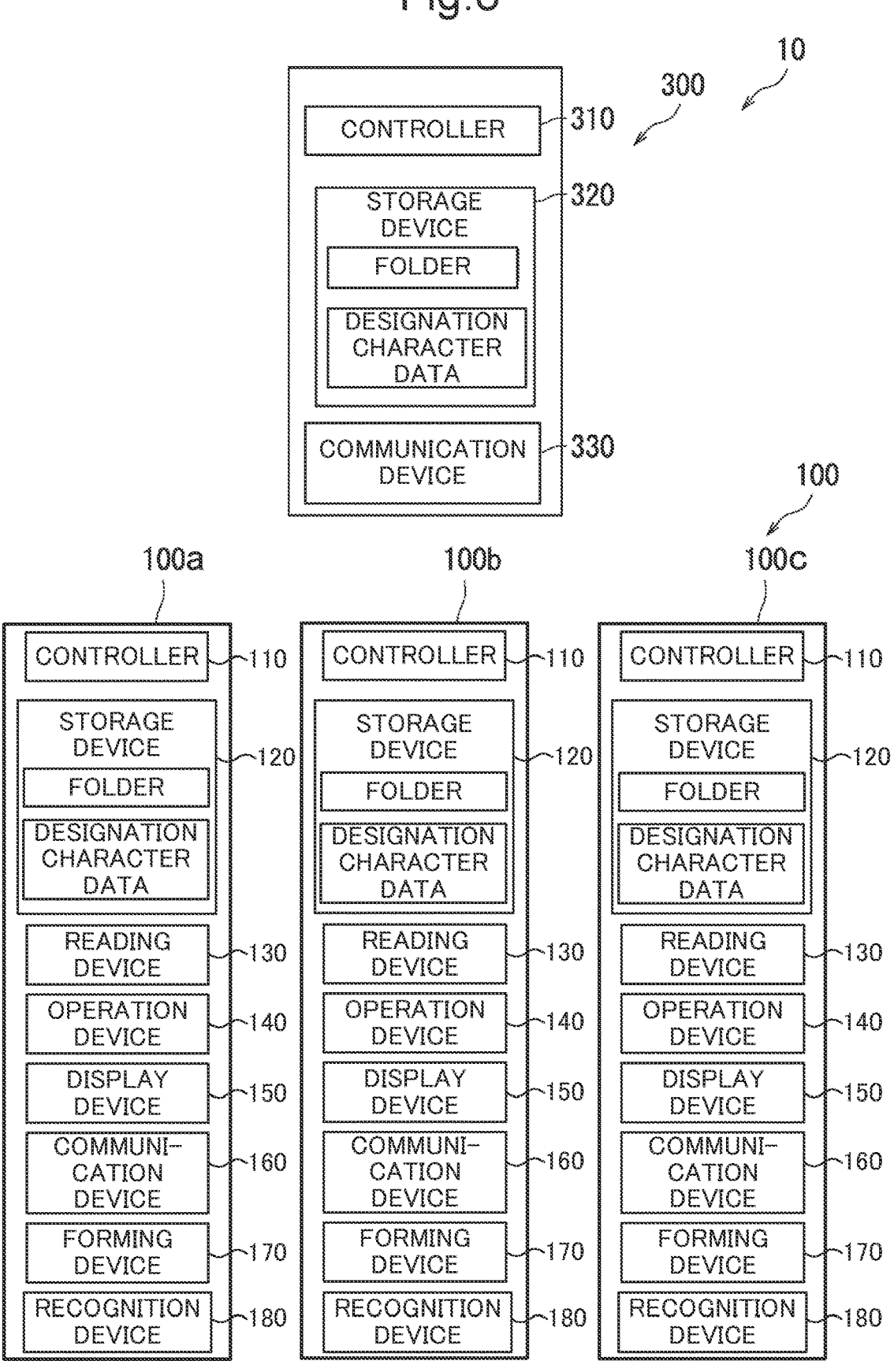
FIG. 8 is a block diagram of the data communication system including the image reading apparatuses of the present embodiment.

Next, with reference to FIG. 8, a constitution of the data communication system 10 will be described. FIG. 8 is a block diagram of the data communication system 10. The data communication system 10 in FIG. 8 has a constitution similar to that of the data communication system 10 in FIG.

2 except that the storage device 120 of the image reading apparatus 100 and the storage device 320 of the data management apparatus 300 store designation character data and the image reading apparatus 100 further includes a recognition device 180, and duplicate description will be omitted for the purpose of avoiding redundancy.

As shown in FIG. 8, in the data management apparatus 300, the storage device 320 stores designation character data. Designation character data designates characters to be included in scan data stored in the shared folder. The storage device 320 stores designation character data and a folder in association with each other.

In addition, in the image reading apparatus 100, the storage device 120 stores designation character data. Designation character data designates characters to be included in scan data stored in the shared folder. The storage device 120 stores designation character data and a folder of the data management apparatus 300 in association with each other.

The image reading apparatus 100 further includes the recognition device 180. The recognition device 180 recognizes character data included in scan data. Specifically, the recognition device 180 converts image data of scan data into character code data and recognizes character data utilizing a part of the character code data.

The recognition device 180 converts image data into character code data. The recognition device 180 may generate data obtained by converting image data into character code data as a new file by optical character recognition (OCR) processing. The file format of character code data is not particularly limited. For example, the file format of character code data may be any of extensible markup language (XML), PDF, document creating software, spreadsheet software, and presentation software.

The image reading apparatus 100 may judge whether or not to transmit scan data to the data management apparatus 300 in accordance with character data recognized by the recognition device 180. For example, when scanning character data includes characters indicated in designation character data, the image reading apparatus 100 transmits scan data to the data management apparatus 300. On the other hand, when scanning character data includes no characters indicated in designation character data, scan data may not be transmitted to the data management apparatus 300.

When character data recognized by the recognition device 180 includes designation character data, the controller 110 sets folder designation information so as to designate a folder in which the folder designation information is associated with the designation character data. At this time, the image reading apparatus 100 may notify the operator such that the operator can recognize which folder is a folder associated with designation character data, that is, a storage location of scan data. A notification may be a display by the display device 150 or may be an audio output. In addition, when character data recognized by the recognition device 180 includes no designation character data, the image reading apparatus 100 may perform display for requesting the operator to designate a folder in which scan data should be stored. In addition, when the operator designates a particular folder as a storage location of scan data, if the folder associated with designation character data included in scanning character data does not match the designated particular folder, a notification of prompting the operator to perform an operation of changing folder designation may be issued.

In addition, the image reading apparatus 100 may transmit character code data to the data management apparatus 300 together with scan data. Alternatively, the data management apparatus 300 may include a recognition device recognizing character data included in scan data. In these cases, the data management apparatus 300 may judge whether or not to store scan data received from the image reading apparatus 100 in the storage device 320 in accordance with designation character data. For example, when scan data includes no predetermined character designated in designation character data, the data management apparatus 300 may not store scan data received from the image reading apparatus 100 in the storage device 320.

Alternatively, the data management apparatus 300 may select a folder for storing scan data received from the image reading apparatus 100 in accordance with character data recognized by the recognition device. For example, when scan data includes no predetermined character designated in designation character data, the data management apparatus 300 may store scan data received from the image reading apparatus 100 in a folder different from that for folder designation information.

Designation character data may be used in either the image reading apparatus 100 or the data management apparatus 300. For this reason, at least one of the storage device 120 of the image reading apparatus 100 and the storage device 320 of the data management apparatus 300 may store designation character data. For example, designation character data may be stored in the data management apparatus 300 and be transmitted from the data management apparatus 300 to the image reading apparatus 100.

In the description with reference to FIGS. 1 to 8, designation of a shared folder, a scanning operation, and a printing operation are performed in the image reading apparatus 100, but the present embodiment is not limited to this. At least any of designation of a shared folder, a scanning operation, and a printing operation may be performed by an information processing apparatus which operates in association with the image reading apparatus 100. In addition, when at least any of designation of a shared folder, a scanning operation, and a printing operation is performed by the information processing apparatus which operates in association with the image reading apparatus 100, the information processing apparatus may display a hierarchical structure of folders in a form different from that of the image reading apparatus 100.

Figure 9:
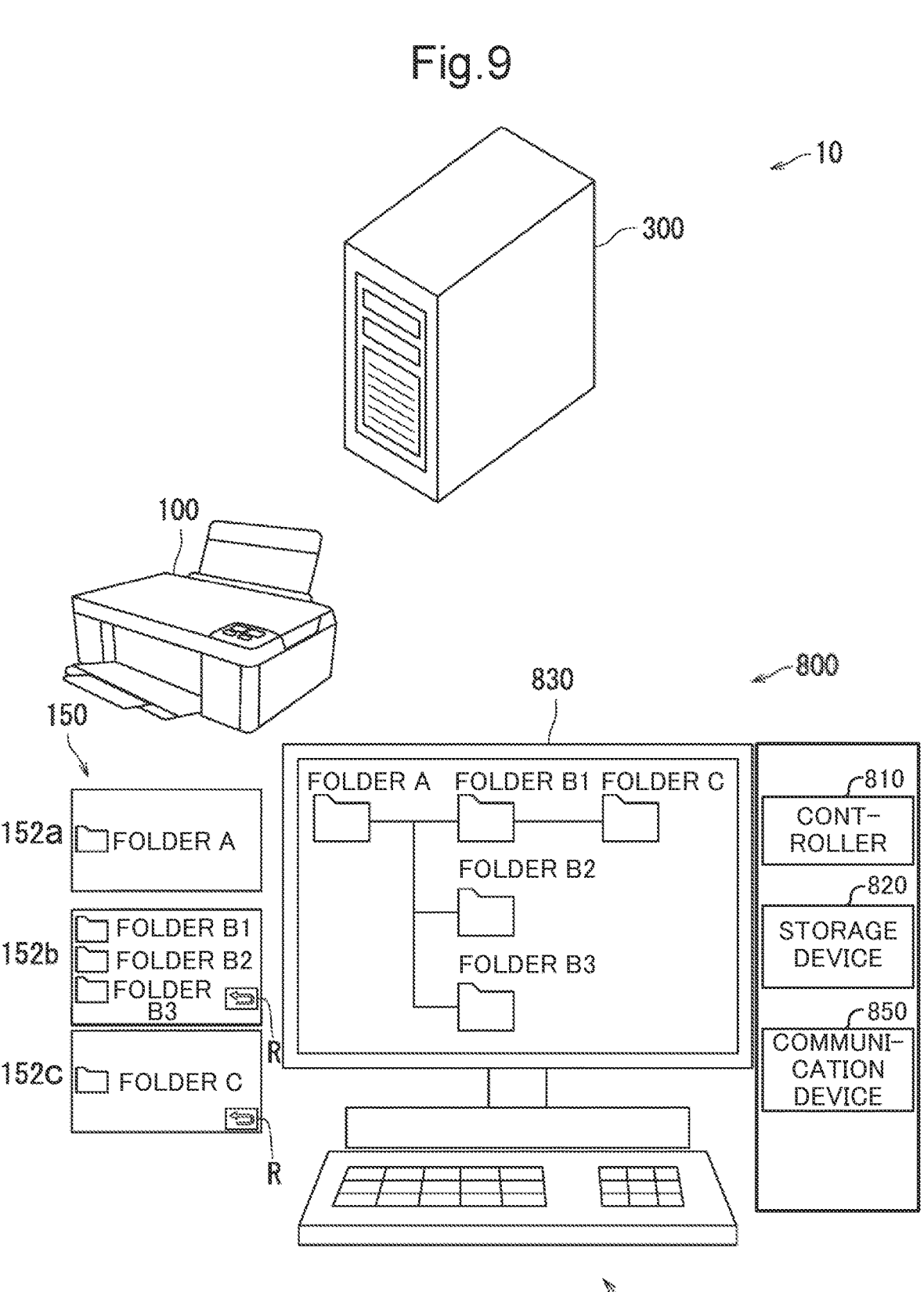
FIG. 9 is a schematic view of the data communication system of the present embodiment.

Next, with reference to FIG. 9, a constitution of the data communication system 10 will be described. FIG. 9 is a block diagram of the data communication system 10. The data communication system 10 in FIG. 9 includes an information processing apparatus 800 in addition to the image reading apparatus 100. The information processing apparatus 800 has a display screen larger than the display device 150 of the image reading apparatus 100. The information processing apparatus 800 is a so-called personal computer.

An application program which operates in association with the image reading apparatus 100 may be installed in the information processing apparatus 800. For example, a general-purpose information processing apparatus, in which an application program that operates in association with the image reading apparatus 100 is installed, can be used as the information processing apparatus 800. For example, an information processing apparatus in which an application program is installed from the data management apparatus 300 functions as the information processing apparatus 800.

As shown in FIG. 9, the information processing apparatus 800 has a controller 810, a storage device 820, a display device 830, an operation device 840, and a communication device 850. The controller 810 controls the storage device 820, the display device 830, the operation device 840, and the communication device 850.

The controller 810 includes a computing element. The computing element includes a processor. As an example, the processor includes a central processing unit (CPU). The processor may include an application specific integrated circuit (ASIC).

The storage device 820 stores various kinds of data. For example, the storage device 820 stores a control program for driving the information processing apparatus 800. The controller 810 controls operation of the information processing apparatus 800 by executing the control program. Specifically, the processor of the controller 810 controls the constituents of the information processing apparatus 800 by executing the computer program stored in the storage element of the storage device 820.

The display device 830 displays an operation screen or results of various kinds of processing. The display device 830 includes a liquid crystal display or an organic EL display. The display device 830 has a display screen.

The operation device 840 receives an instruction of the operator. The operation device 840 includes buttons or a keyboard. Alternatively, the operation device 840 may include a touch sensor. The display device 830 and the operation device 840 may be integrated together in a touch panel. A signal indicating an instruction corresponding to operation of the buttons, the keyboard, or the touch panel is output to the controller 810 or the like.

For example, the communication device 850 includes a network interface and communicates with external equipment. Here, the communication device 850 transmits a particular signal to the image reading apparatus 100. The communication device 850 may receive a particular signal from the image reading apparatus 100.

In addition, the communication device 850 may transmit a particular signal to the data management apparatus 300. Moreover, the communication device 850 may receive a particular signal from the data management apparatus 300.

The display device 830 of the information processing apparatus 800 may function in a manner similar to the display device 150 of the image reading apparatus 100. In addition, the operation device 840 of the information processing apparatus 800 may function in a manner similar to the operation device 140 of the image reading apparatus 100.

The information processing apparatus 800 receives a hierarchical structure display signal. The information processing apparatus 800 may directly receive a hierarchical structure display signal from the data management apparatus 300. Alternatively, the information processing apparatus 800 may receive a hierarchical structure display signal from the data management apparatus 300 via the image reading apparatus 100.

The display device 830 has a relatively large display screen. The display device 830 displays the hierarchical structure of folders of the data management apparatus 300 in accordance with an instruction of the operator. The display device 830 displays the hierarchical structure of folders of the storage device 320 in accordance with a hierarchical structure display signal.

Here, the display device 830 displays the entire hierarchical structure of folders in the storage device 320 in accordance with a hierarchical structure display signal. The display device 830 displays the entire hierarchical structure of folders. Regarding the hierarchical structure of folders, the display device 830 displays that the folder A is in a superior level, the folders B1 to B3 are included in the folder A, and the folder C is included in the folder B1 all at once (in the same display screen).

The image reading apparatus 100 receives a hierarchical structure display signal. The display device 150 has a relatively small display screen. The display device 150 displays the hierarchical structure of folders of the data management apparatus 300 in accordance with an instruction of the operator.

The display device 150 displays the hierarchical structure of folders of the storage device 320 in accordance with a hierarchical structure display signal. Regarding the hierarchical structure of folders, the display device 150 sequentially displays that the folder A is in a superior level, the folders B1 to B3 are included in the folder A, and the folder C is included in the folder B1.

Specifically, the display device 150 displays a display screen 152a showing the folder A. If the operation device 140 receives an operation of the operator selecting the folder A, the display device 150 displays a display screen 152b showing the folders B1 to B3 and a return button R.

If the operation device 140 receives an operation of the operator selecting the folder B1, the display device 150 displays a display screen 152c showing the folder C and the return button R. If the operation device 140 receives an operation of the operator selecting the folder B2 or B3, the display device 150 displays a file included in the folder B2 or B3.

When the display device 150 displays the display screen 152b, if the operation device 140 receives an operation of the operator selecting the return button R, the display device 150 switches to a display screen displaying the display screen 152a showing the folder A. Similarly, when the display device 150 displays the display screen 152c, if the operation device 140 receives an operation of the operator selecting the return button R, the display device 150 switches to a display screen displaying the display screen 152b showing the folders B1 to B3 and the return button R.

Both the image reading apparatus 100 and the information processing apparatus 800 display the hierarchical structure of folders of the data management apparatus 300 in accordance with a hierarchical structure display signal. However, typically, the display screen of the display device 150 in the image reading apparatus 100 is smaller than the display screen of the display device 830 in the information processing apparatus 800. In addition, the number of pixels of the display device 150 in the image reading apparatus 100 is smaller than the number of pixels of the display device 830 in the information processing apparatus 800. For this reason, it is preferable for the image reading apparatus 100 to display the hierarchical structure of folders of the data management apparatus 300 in accordance with a hierarchical structure display signal in a form different from that of the information processing apparatus 800.

As described above, the display device 830 of the information processing apparatus 800 may operate in a manner similar to the display device 150 of the image reading apparatus 100. In addition, the operation device 840 of the information processing apparatus 800 may operate in a manner similar to the operation device 140 of the image reading apparatus 100.

For this reason, when the data communication system 10 includes the image reading apparatus 100 and the information processing apparatus 800, the image reading apparatus 100 may not include the display device 150. Similarly, when the data communication system 10 includes the image reading apparatus 100 and the information processing apparatus 800, the image reading apparatus 100 may not include the operation device 140.

In the foregoing description with reference to FIGS. 1 to 8, designation of a shared folder, a scanning operation, and a printing operation are performed in the image reading apparatus 100, but the present embodiment is not limited to this. At least any of designation of a shared folder, a scanning operation, and a printing operation may be performed by an information processing terminal which operates in association with the image reading apparatus 100.

Figure 10:
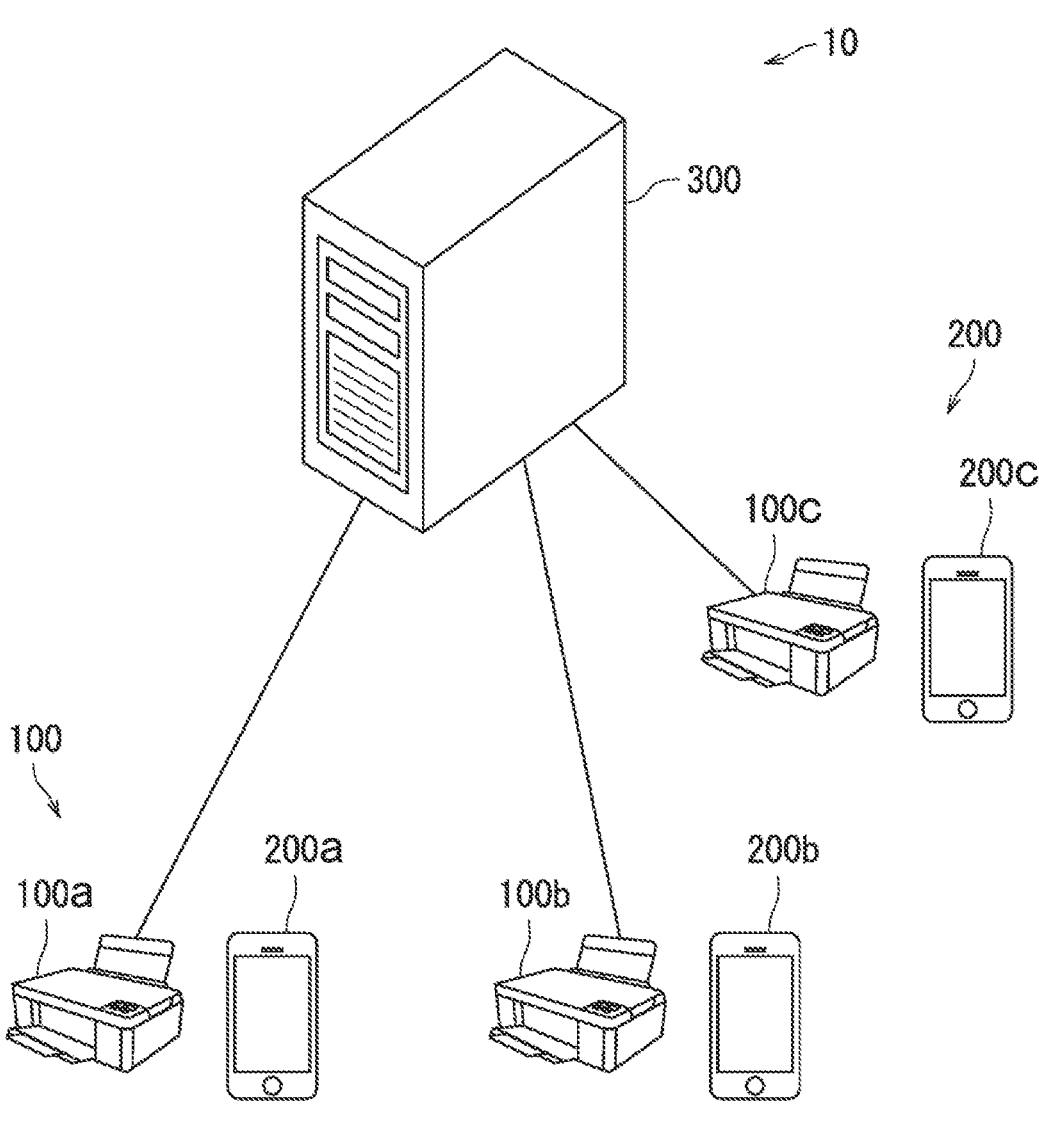
FIG. 10 is a schematic view of the data communication system of the present embodiment.

Next, with reference to FIG. 10, the image reading apparatus 100 of the present embodiment will be described. FIG. 10 is a schematic view of the data communication system 10. The data communication system 10 in FIG. 10 has a constitution similar to that of the data communication system 10 shown in FIG. 1 except for further including information processing terminals 200a to 200c which operate in association with the image reading apparatuses 100a to 100c, and duplicate description will be omitted for the purpose of avoiding redundancy.

As shown in FIG. 10, the data communication system 10 of the present embodiment includes a plurality of image reading apparatuses 100a to 100c and a plurality of information processing terminals 200a to 200c. The image reading apparatus 100a operates in association with the information processing terminal 200a. The image reading apparatus 100b operates in association with the information processing terminal 200b. The image reading apparatus 100c operates in association with the information processing terminal 200c. In this specification, the information processing terminals 200a to 200c may be generically described as information processing terminals 200. The information processing terminal 200 may be a so-called smartphone, a mobile phone, or a tablet.

The information processing terminal 200 may be used for authenticating data communication between the image reading apparatus 100 and the data management apparatus 300. Alternatively, the information processing terminal 200 may be used for supplementation or substitution for the operation device 140 and/or the display device 150 of the image reading apparatus 100.

When the data communication system 10 includes the image reading apparatus 100 and the information processing terminal 200, the image reading apparatus 100 may not include the display device 150. Similarly, when the data communication system 10 includes the image reading apparatus 100 and the information processing terminal 200, the image reading apparatus 100 may not include the operation device 140.

An application program which operates in association with the image reading apparatus 100 may be installed in the information processing terminal 200. For example, a general-purpose information processing terminal, in which an application program that operates in association with the image reading apparatus 100 is installed, can be used as the information processing terminal 200. For example, an information processing terminal in which an application program is installed from the data management apparatus 300 functions as the information processing terminal 200.

Figure 11:
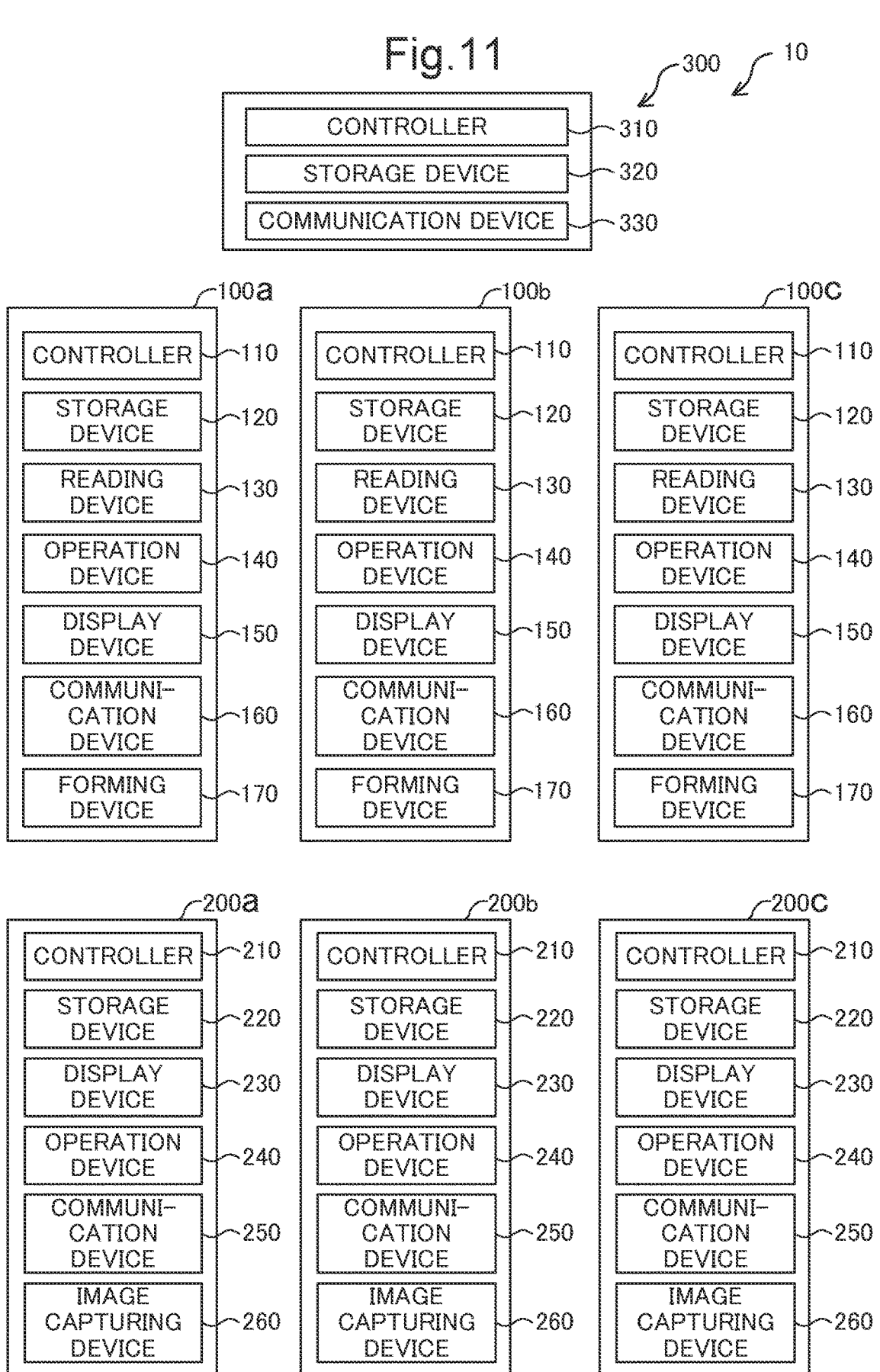
FIG. 11 is a block diagram of the data communication system of the present embodiment.

Next, with reference to FIGS. 10 and 11, a constitution of the data communication system 10 will be described. FIG. 11 is a block diagram of the data communication system 10.

As shown in FIG. 11, the data communication system 10 includes a plurality of image reading apparatuses 100. As described above, the image reading apparatus 100 communicates with the data management apparatus 300.

The information processing terminals 200a to 200c each have a controller 210, a storage device 220, a display device 230, an operation device 240, and a communication device 250. The controller 210 controls the storage device 220, the display device 230, the operation device 240, and the communication device 250.

The controller 210 includes a computing element. The computing element includes a processor. As an example, the processor includes a central processing unit (CPU). The processor may include an application specific integrated circuit (ASIC).

The storage device 220 stores various kinds of data. For example, the storage device 220 stores a control program for driving the information processing terminal 200. The controller 210 controls operation of the information processing terminal 200 by executing the control program. Specifically, the processor of the controller 210 controls the constituents of the information processing terminal 200 by executing the computer program stored in the storage element of the storage device 220.

The display device 230 displays an operation screen or results of various kinds of processing. The display device 230 includes a liquid crystal display or an organic EL display. The display device 230 has a display screen.

As described above, the image reading apparatus 100 may have or may not have the display device 150. Typically, even when the image reading apparatus 100 has the display device 150, the display device 230 of the information processing terminal 200 has a display screen larger than the display device 150.

The operation device 240 may include a touch sensor. The display device 230 and the operation device 240 may be integrated together in a touch panel. For example, the touch panel displays various keys for instructing the kind of job and the details of job. Alternatively, the operation device 240 may include buttons or a keyboard.

The communication device 250 communicates with external equipment. Here, the communication device 250 transmits a particular signal to the image reading apparatus 100. The communication device 250 may receive a particular signal from the image reading apparatus 100.

In addition, the communication device 250 transmits a particular signal to the data management apparatus 300. Moreover, the communication device 250 may receive a particular signal from at least the data management apparatus 300.

The information processing terminal 200 may further have an image capturing device 260 capable of capturing images. The image capturing device 260 includes an image capturing element. For example, the image capturing element is a charge coupled device (CCD) image sensor, or a complementary metal oxide semiconductor (CMOS) image sensor.

The information processing terminal 200 may perform any of designation of a shared folder, a scanning operation, and a printing operation. The information processing terminal 200 may designate a shared folder for storing scan data. In addition, the information processing terminal 200 may designate print data to be read from the shared folder. The information processing terminal 200 may receive an operation of executing scanning of the image reading apparatus 100 and transmit a signal instructing execution of scanning to the image reading apparatus 100. The information processing terminal 200 may receive an operation of executing printing of the image reading apparatus 100 and transmit a signal instructing execution of printing to the image reading apparatus 100.

Figure 12:
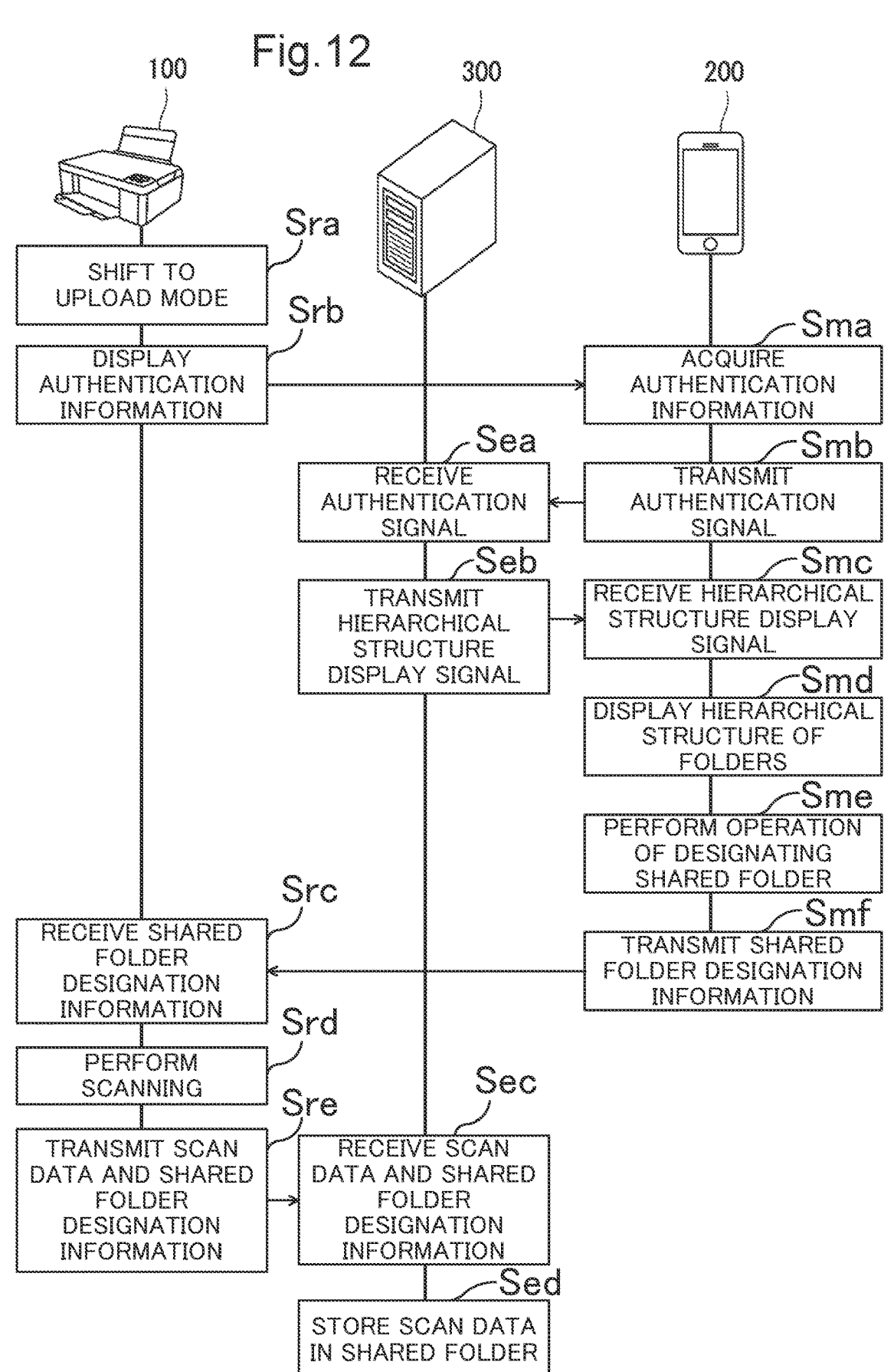
FIG. 12 is a flowchart of uploading of scan data on the shared folder in the data communication system of the present embodiment.

Next, with reference to FIGS. 10 to 12, uploading of scan data in the data communication system 10 of the present embodiment will be described. FIG. 12 is a flowchart of uploading of scan data on the shared folder in the data communication system of the present embodiment.

As shown in FIG. 12, in Step Sra, the image reading apparatus 100 shifts to the upload mode. Specifically, if the operation device 140 receives an operation of the operator, the controller 110 shifts to the upload mode.

In Step Srb, the image reading apparatus 100 displays authentication information. Specifically, the display device 150 displays authentication information unique to the image reading apparatus 100. Authentication information is information indicating that the image reading apparatus 100 has been authenticated with respect to the data management apparatus 300. For example, authentication information is two-dimensional code information. Authentication information may be a password.

In Step Sma, the information processing terminal 200 acquires authentication information. Specifically, the image capturing device 260 captures an image of authentication information displayed in the display device 150 of the image reading apparatus 100. Alternatively, the operation device 240 receives an operation of the operator inputting authentication information displayed in the display device 150.

In Step Smb, the information processing terminal 200 transmits an authentication signal to the data management apparatus 300 on the basis of authentication information. Specifically, the communication device 250 transmits an authentication signal to the data management apparatus 300. An authentication signal indicates that the image reading apparatus 100 is scheduled to upload scan data on the data management apparatus 300.

In Step Sea, the data management apparatus 300 receives an authentication signal from the information processing terminal 200. Specifically, the communication device 330 receives an authentication signal from the information processing terminal 200. The controller 310 allows uploading of scan data from the image reading apparatus 100 based on an authentication signal.

In Step Seb, the data management apparatus 300 transmits a hierarchical structure display signal indicating the hierarchical structure of folders in the storage device 320 to the information processing terminal 200. Specifically, the communication device 330 transmits a hierarchical structure display signal to the information processing terminal 200.

In Step Smc, the information processing terminal 200 receives a hierarchical structure display signal from the data management apparatus 300. Specifically, the communication device 250 receives a hierarchical structure display signal from the data management apparatus 300.

In Step Smd, the information processing terminal 200 displays the hierarchical structure of folders in the storage device 320 in accordance with a hierarchical structure display signal. Specifically, the display device 230 displays the hierarchical structure of folders of the data management apparatus 300 in accordance with a hierarchical structure display signal. Typically, if the operation device 240 receives an operation of the operator, the display device 230 displays the hierarchical structure of folders of the data management apparatus 300.

In Step Sme, the information processing terminal 200 designates a shared folder for storing scan data. Typically, the operation device 240 receives an operation of designating a shared folder in the hierarchical structure of folders as a storage location.

In addition, the operation device 240 receives an operation of starting scanning of a sheet in the image reading apparatus 100.

In Step Smf, the information processing terminal 200 transmits shared folder designation information designating a shared folder for storing scan data in the hierarchical structure of folders of the data management apparatus 300 to the image reading apparatus 100. For example, if an operation of executing scanning of the image reading apparatus 100 is received in the operation device 240, the communication device 250 transmits shared folder designation information to the image reading apparatus 100.

In Step Src, the image reading apparatus 100 receives shared folder designation information from the information processing terminal 200. Specifically, the communication device 160 receives shared folder designation information transmitted from the communication device 250.

In Step Srd, the image reading apparatus 100 scans a sheet. Specifically, the reading device 130 generates scan data by scanning a sheet. As necessary, the storage device 120 may store scan data.

In Step Sre, the image reading apparatus 100 transmits scan data and shared folder designation information to the data management apparatus 300. Specifically, the communication device 160 transmits scan data and shared folder designation information to the data management apparatus 300.

In Step Sec, the data management apparatus 300 receives scan data and shared folder designation information from the information processing terminal 200. Specifically, the communication device 330 receives scan data and shared folder designation information from the image reading apparatus 100.

In Step Sed, the data management apparatus 300 stores scan data in the folder designated in shared folder designation information.

According to the image reading apparatus 100 of the present embodiment, a shared folder for storing scan data can be simply designated. In addition, even if the functions of the controller 110 are limited, authentication of the data management apparatus 300 can be easily executed using the information processing terminal 200. Accordingly, the image reading apparatus 100 can upload scan data on the data management apparatus 300.

In the description with reference to FIG. 12, scan data of the image reading apparatus 100 is transmitted to the data management apparatus 300, but print data of the data management apparatus 300 may be transmitted to the image reading apparatus 100 in the data communication system 10. In this case, it is preferable for the image reading apparatus 100 to form an image in accordance with print data transmitted from the data management apparatus 300.

Figure 13:
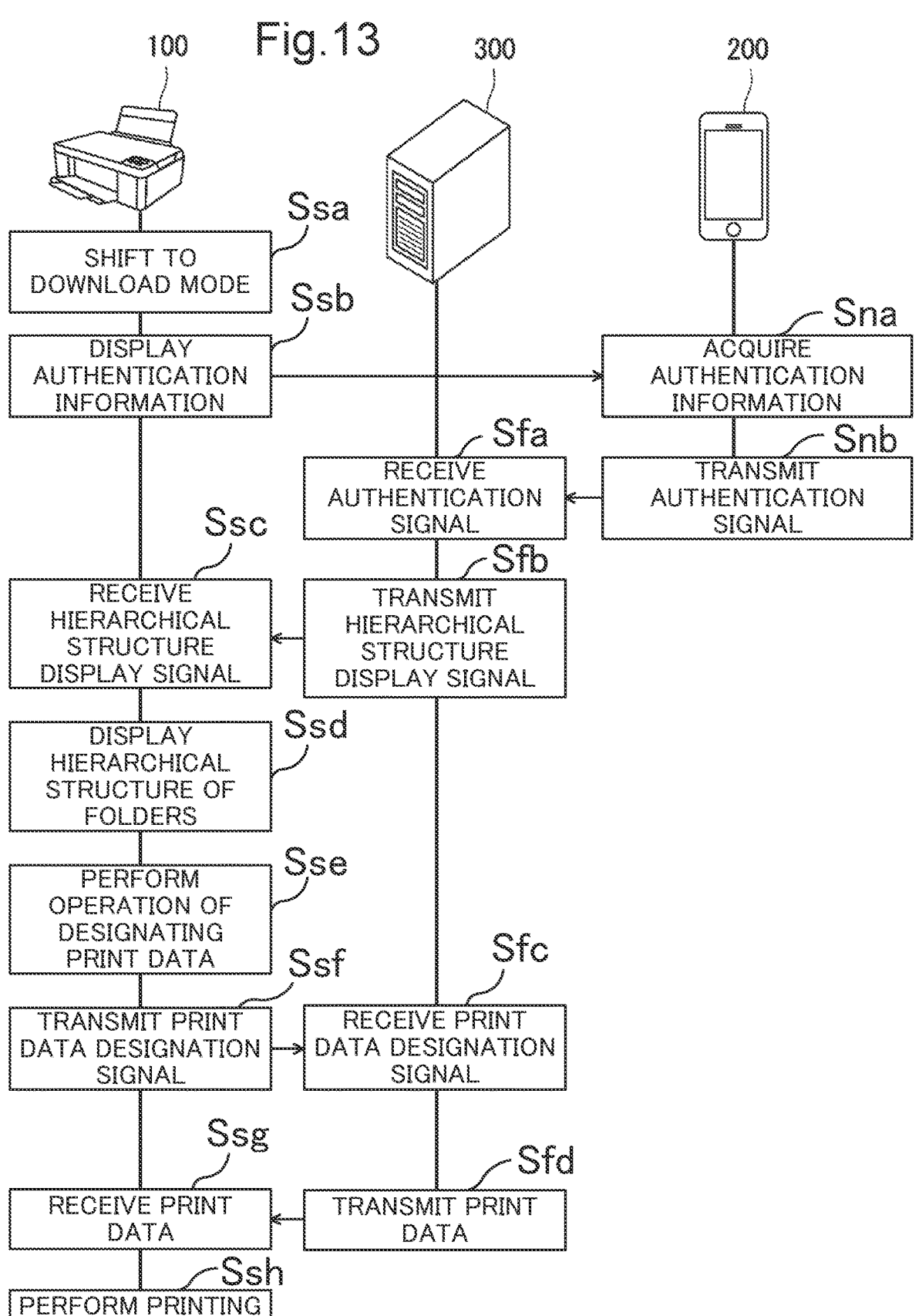
FIG. 13 is a flowchart of downloading of print data from the shared folder in the data communication system of the present embodiment.

Next, with reference to FIGS. 10 to 13, downloading of print data in the data communication system 10 including the image reading apparatuses 100 of the present embodiment will be described. FIG. 13 is a flowchart of downloading of print data from the shared folder in the data communication system 10 of the present embodiment.

As shown in FIG. 13, in Step Ssa, the image reading apparatus 100 shifts to the download mode. If the operation device 140 receives an operation of the operator for a shift to the download mode, the controller 110 shifts to the download mode.

In Step SSb, the image reading apparatus 100 displays authentication information. The display device 150 displays authentication information unique to the image reading apparatus 100. Authentication information is information indicating that the image reading apparatus 100 has been authenticated with respect to the data management apparatus 300.

In Step Sna, the information processing terminal 200 acquires authentication information. The image capturing device 260 captures an image of authentication information displayed in the display device 150 of the image reading apparatus 100.

Alternatively, the operation device 240 receives an operation of the operator inputting authentication information displayed in the display device 150.

In Step Snb, the information processing terminal 200 transmits an authentication signal to the data management apparatus 300 on the basis of authentication information. The communication device 250 transmits an authentication signal to the data management apparatus 300. An authentication signal indicates that the image reading apparatus 100 is scheduled to download print data from the data management apparatus 300.

In Step Sfa, the data management apparatus 300 receives an authentication signal from the information processing terminal 200. Specifically, the communication device 330 receives an authentication signal from the information processing terminal 200.

In Step Sfb, the data management apparatus 300 transmits a hierarchical structure display signal indicating the hierarchical structure of folders in the storage device 320 to the image reading apparatus 100. Specifically, the communication device 330 transmits a hierarchical structure display signal to the image reading apparatus 100.

In Step SSc, the image reading apparatus 100 receives a hierarchical structure display signal from the data management apparatus 300. Specifically, the communication device 160 receives a hierarchical structure display signal from the data management apparatus 300.

In Step Ssd, the image reading apparatus 100 displays the hierarchical structure of folders in the storage device 320 in accordance with a hierarchical structure display signal. Specifically, the display device 150 displays the hierarchical structure of folders of the data management apparatus 300 in accordance with a hierarchical structure display signal. Typically, if the operation device 140 receives an operation of the operator, the display device 150 displays the hierarchical structure of folders of the data management apparatus 300.

In Step Sse, the image reading apparatus 100 receives an operation of designating a shared folder for storing print data in the hierarchical structure of folders in the storage device 320. Typically, the operation device 140 receives an operation of designating a shared folder for storing print data in the hierarchical structure of folders.

In Step Ssf, the image reading apparatus 100 transmits a print data designation signal for designating data stored in the shared folder to the data management apparatus 300. Specifically, the communication device 160 transmits a print data designation signal to the data management apparatus 300.

In Step Sfc, the data management apparatus 300 receives a print data designation signal from the image reading apparatus 100. Specifically, the communication device 330 receives a print data designation signal from the image reading apparatus 100.

In Step Sfd, the data management apparatus 300 transmits print data designated in a print data designation signal to the image reading apparatus 100. Specifically, in folders of the storage device 320, the controller 310 identifies the shared folder including print data designated in a print data designation signal and reads the print data from the identified shared folder. The communication device 330 transmits print data to the image reading apparatus 100.

In Step Ssg, the image reading apparatus 100 receives print data from the data management apparatus 300. Specifically, the communication device 160 receives print data from the data management apparatus 300.

In Step Ssh, the image reading apparatus 100 forms an image on a sheet in accordance with print data. Specifically, the forming device 170 forms an image on a sheet in accordance with print data.

In the image reading apparatus 100 of the present embodiment, print data can be downloaded from a predetermined shared folder of the data management apparatus 300, and an image can be formed on a sheet in accordance with the print data.

In the foregoing description with reference to FIG. 13, the data management apparatus 300 transmits a hierarchical structure display signal to the image reading apparatus 100 after an authentication signal is received from the information processing terminal 200, but the present embodiment is not limited to this. The data management apparatus 300 may transmit a hierarchical structure display signal to the information processing terminal 200 after an authentication signal is received from the information processing terminal 200.

Next, with reference to FIG. 14, downloading of print data in the data communication system 10 of the present embodiment will be described.

Figure 14:
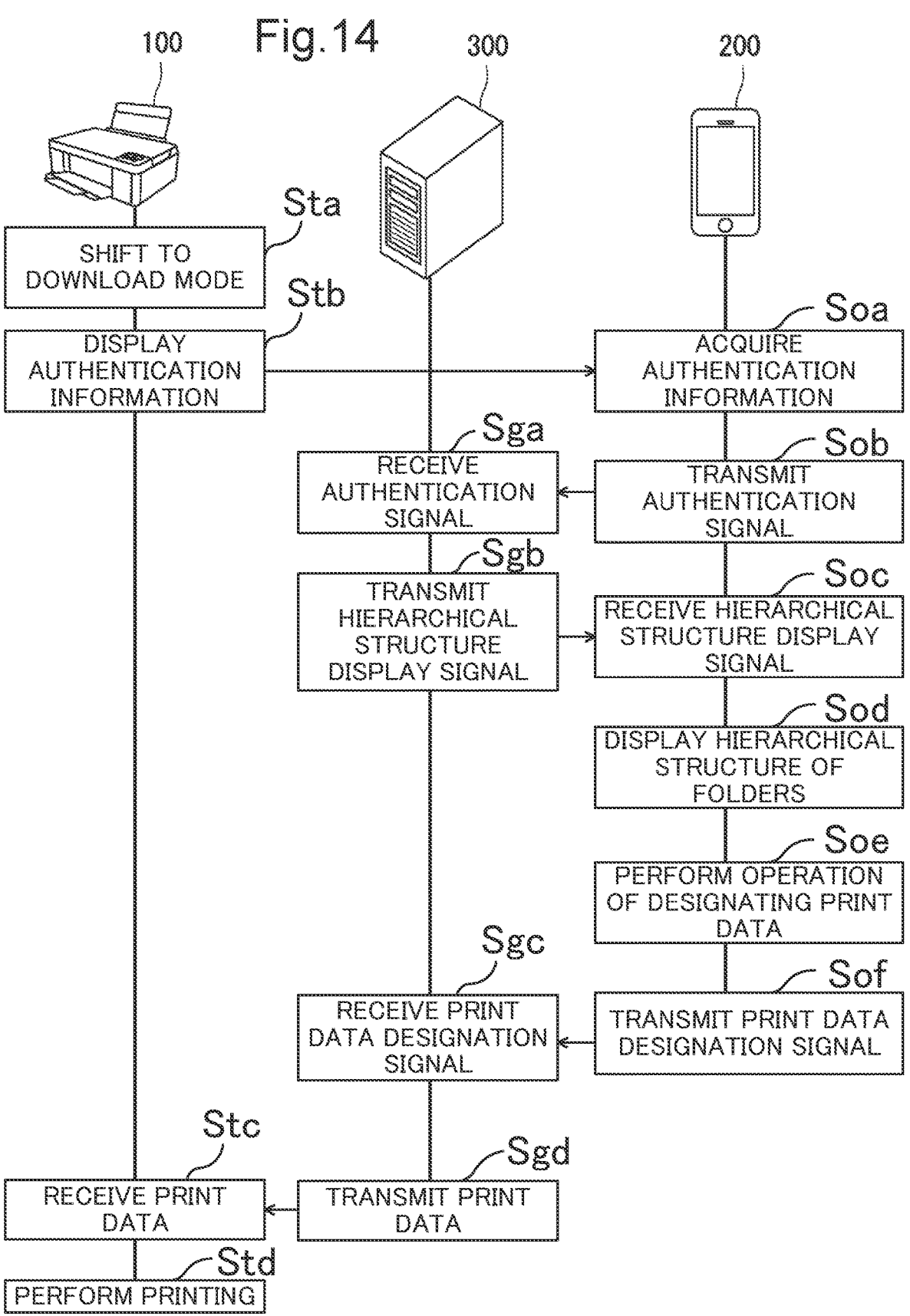
FIG. 14 is a flowchart of downloading of print data in the data communication system of the present embodiment.

As shown in FIG. 14, in Step Sta, the image reading apparatus 100 shifts to the download mode. If the operation device 140 receives an operation of the operator, the controller 110 shifts to the download mode.

In Step Stb, the image reading apparatus 100 displays authentication information. The display device 150 displays authentication information unique to the image reading apparatus 100. Authentication information is information indicating authentication of the image reading apparatus 100 with respect to the data management apparatus 300. For example, authentication information is two-dimensional code information.

In Step Soa, the information processing terminal 200 captures an image of authentication information. The image capturing device 260 captures an image of authentication information displayed in the display device 150 of the image reading apparatus 100.

In Step Sob, the information processing terminal 200 transmits an authentication signal to the data management apparatus 300 on the basis of authentication information. The communication device 250 transmits an authentication signal to the data management apparatus 300.

In Step Sga, the data management apparatus 300 receives an authentication signal from the information processing terminal 200. Specifically, the communication device 330 receives an authentication signal from the information processing terminal 200. The controller 310 allows a request for downloading from the image reading apparatus 100 based on an authentication signal.

In Step Sgb, the data management apparatus 300 transmits a hierarchical structure display signal indicating the hierarchical structure of folders in the storage device 320 to the information processing terminal 200. Specifically, the communication device 330 transmits a hierarchical structure display signal to the information processing terminal 200.

In Step Soc, the information processing terminal 200 receives a hierarchical structure display signal from the data management apparatus 300. Specifically, the communication device 250 receives a hierarchical structure display signal from the data management apparatus 300.

In Step Sod, the information processing terminal 200 displays the hierarchical structure of folders in the storage device 320 in accordance with a hierarchical structure display signal. Specifically, the display device 230 displays the hierarchical structure of folders of the data management apparatus 300 in accordance with a hierarchical structure display signal. Typically, if the operation device 240 receives an operation of the operator, the display device 230 displays the hierarchical structure of folders of the data management apparatus 300.

In Step Soe, the information processing terminal 200 receives an operation of designating a folder for storing print data in the hierarchical structure of folders in the storage device 320. Typically, the operation device 240 receives an operation of designating a folder for storing print data in the hierarchical structure of folders.

In Step Sof, the information processing terminal 200 transmits a print data designation signal for designating data stored in the folder to the data management apparatus 300. Specifically, the communication device 250 transmits a print data designation signal to the data management apparatus 300.

In Step Sgc, the data management apparatus 300 receives a print data designation signal from the information processing terminal 200. Specifically, the communication device 330 receives a print data designation signal from the information processing terminal 200.

In Step Sgd, the data management apparatus 300 transmits print data designated in a print data designation signal to the image reading apparatus 100. Specifically, in folders of the storage device 320, the controller 310 identifies the folder including print data designated in a print data designation signal and reads the print data from the identified folder. The communication device 330 transmits print data to the image reading apparatus 100.

In Step Stc, the image reading apparatus 100 receives print data from the data management apparatus 300. Specifically, the communication device 160 receives print data from the data management apparatus 300.

In Step Std, the image reading apparatus 100 forms an image on a sheet in accordance with print data. Specifically, the forming device 170 forms an image on a sheet in accordance with print data.

In the present embodiment, print data can be downloaded from a predetermined shared folder of the data management apparatus 300, and an image can be formed on a sheet in accordance with the print data.

The data communication system 10 shown in FIGS. 1 to 14 includes a plurality of image reading apparatuses 100, but the functions of the plurality of image reading apparatuses 100 may not be equivalent to each other. In addition, the data communication system 10 shown in FIGS. 10 to 14 includes a plurality of information processing terminals 200 in addition to the plurality of image reading apparatuses 100, but the functions of the plurality of information processing terminals 200 may not be equivalent to each other.

Figure 15:
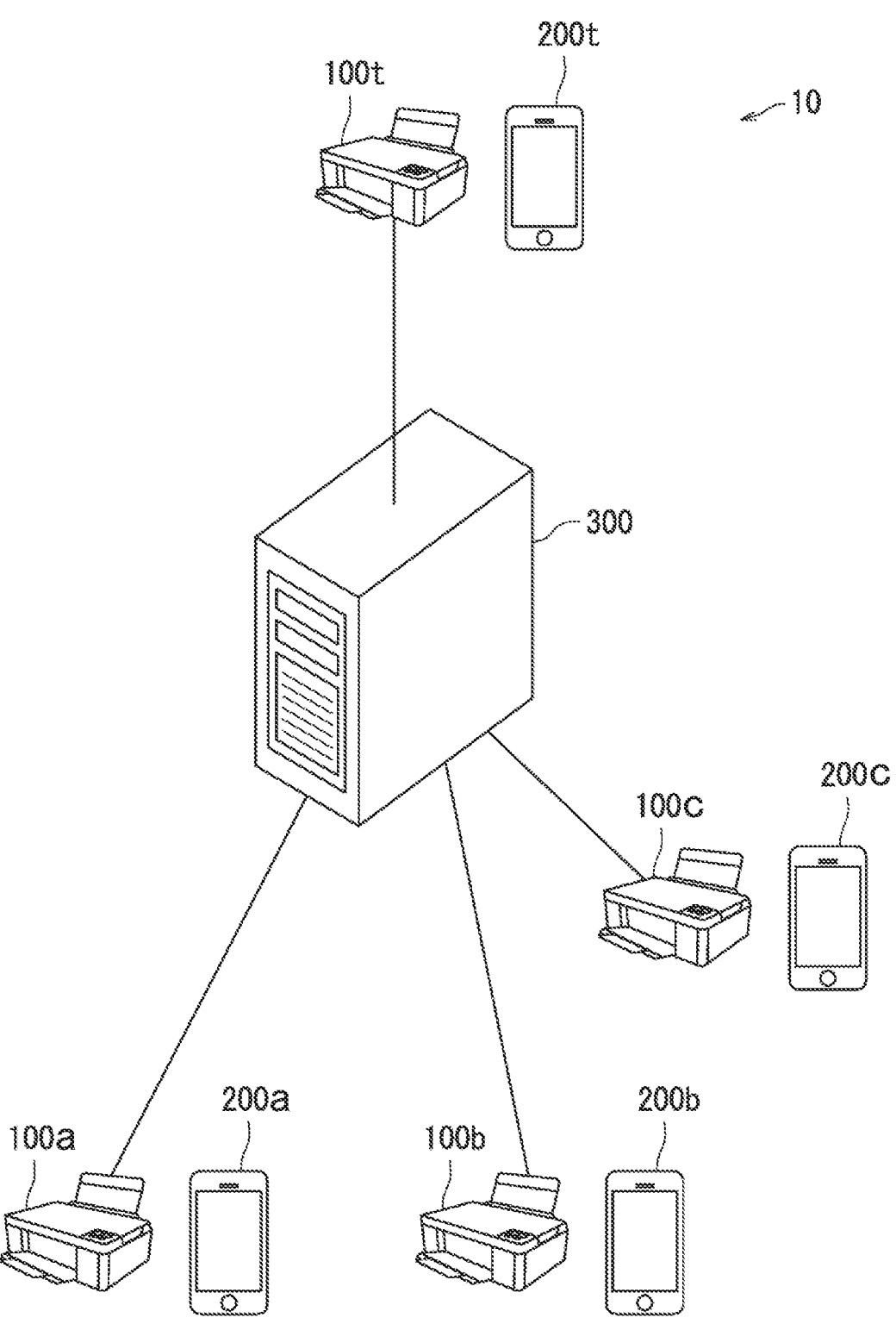
FIG. 15 is a schematic view of the data communication system of the present embodiment.

Next, with reference to FIGS. 1 to 15, the data communication system 10 of the present embodiment will be described. FIG. 15 is a schematic view of the data communication system 10. The data communication system 10 in FIG. 15 has a constitution similar to that of the data communication system 10 shown in FIGS. 10 to 14 except that the functions of the image reading apparatus 100 and the information processing terminal 200 are different, and duplicate description will be omitted for the purpose of avoiding redundancy.

As shown in FIG. 15, the data communication system 10 of the present embodiment has a plurality of image reading apparatuses 100. The plurality of image reading apparatuses 100 include the image reading apparatuses 100a to 100c and an image reading apparatus 100t. The functions of the image reading apparatuses 100a to 100c are equivalent to each other. On the other hand, the function of the image reading apparatus 100t differs from the functions of the image reading apparatuses 100a to 100c. The image reading apparatus 100t has a function that is not allowed to the image reading apparatuses 100a to 100c.

The data communication system 10 of the embodiment may include the plurality of information processing terminals 200 which operate in association with the plurality of image reading apparatuses 100. The plurality of information processing terminals 200 include the information processing terminals 200a to 200c and an information processing terminal 200t. The functions of the information processing terminals 200a to 200c are equivalent to each other. On the other hand, the function of the information processing terminal 200t differs from the functions of the information processing terminals 200a to 200c. The information processing terminal 200t has a function that is not allowed to the information processing terminals 200a to 200c.

The data communication system 10 of the present embodiment is favorably utilized for distribution of assignments, collection of answers, evaluation of answers, and return of evaluation results. In this case, the image reading apparatus 100t and the information processing terminal 200t are favorably used by an assignment distributor who distributes assignments. Examples of an assignment distributor include a manager, a teacher, and an instructor.

The image reading apparatuses 100a to 100c and the information processing terminals 200a to 200c are favorably used by answerers who answer an assignment. Examples of answerers include persons to be managed, pupils, and students.

Next, with reference to FIGS. 1 to 18, the data communication system 10 of the present embodiment will be described. FIGS. 16A to 18B are schematic explanatory views of uploading of scan data and downloading of print data utilizing the shared folder in the data communication system 10 of the present embodiment. Here, an operator of the image reading apparatus 100t and the information processing terminal 200t will be regarded as an operator T. In addition, an operator of the image reading apparatus 100a and the information processing terminal 200a will be regarded as an operator A, an operator of the image reading apparatus 100b and the information processing terminal 200b will be regarded as an operator B, and an operator of the image reading apparatus 100c and the information processing terminal 200c will be regarded as an operator C.

As shown in FIG. A, the image reading apparatus 100t generates assignment scan data SSD by scanning an assignment sheet SS. Thereafter, the image reading apparatus 100t transmits the assignment scan data SSD to the data management apparatus 300.

The data management apparatus 300 has an assignment folder and a submission folder as shared folders. The assignment folder is used for distributing the assignment sheet SS. The submission folder is used when an answer sheet RS made by writing an answer in the assignment sheet SS is submitted. The assignment folder and the submission folder may be created in the data management apparatus 300 using the image reading apparatus 100t or the information processing terminal 200t.

The image reading apparatus 100t transmits the assignment scan data SSD together with shared folder designation information designating an assignment folder to the data management apparatus 300.

The data management apparatus 300 receives the assignment scan data SSD together with shared folder designation information designating an assignment folder. The data management apparatus 300 stores the assignment scan data SSD inside the assignment folder of the hierarchical structure. Accordingly, the assignment scan data SSD is uploaded on the assignment folder of the hierarchical structure in the data management apparatus 300.

Figure 16A:
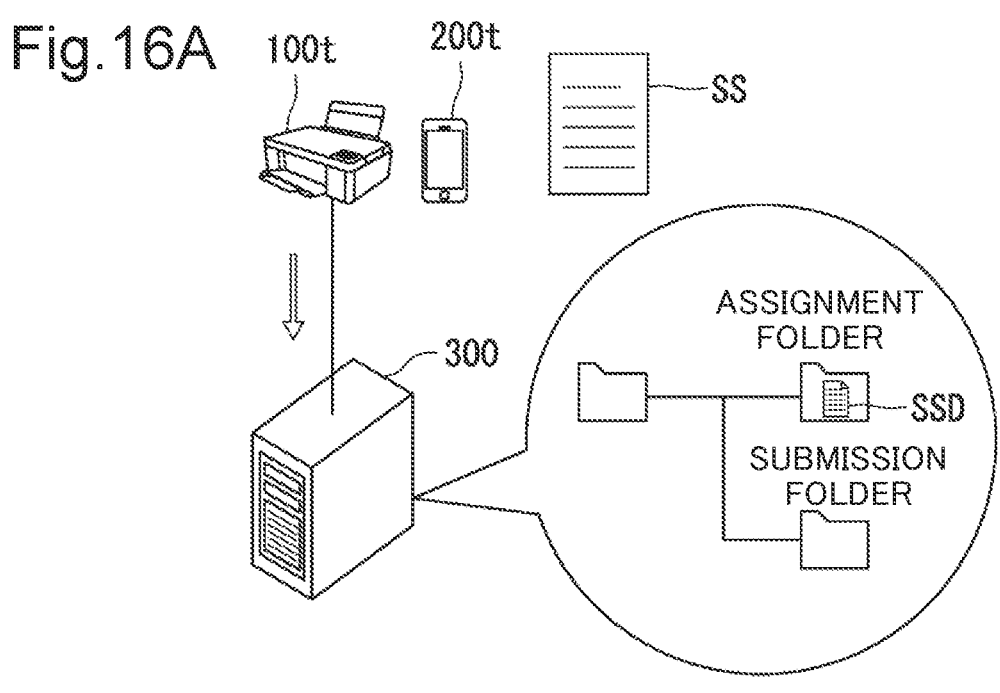
FIGS. 16A and 16B are schematic explanatory views of uploading of scan data and downloading of print data utilizing the shared folder in the data communication system of the present embodiment.
Figure 16B:
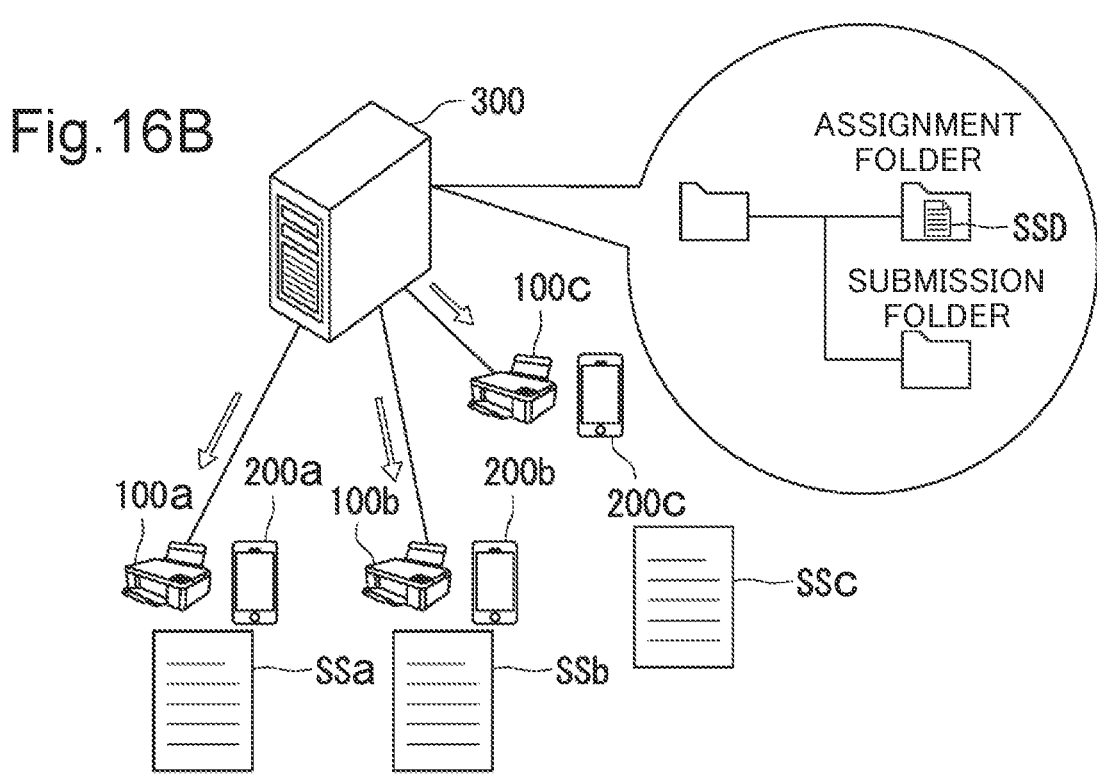

As shown in FIG. 16B, the image reading apparatuses 100a to 100c read and receive the assignment scan data SSD from the assignment folder of the hierarchical structure in the data management apparatus 300. Accordingly, the assignment scan data SSD is downloaded to the image reading apparatuses 100a to 100c from the assignment folder of the hierarchical structure of folders of the data management apparatus 300.

The image reading apparatus 100a forms an image corresponding to the assignment scan data SSD on a sheet. Accordingly, the image reading apparatus 100a can form an assignment sheet SSa.

Similarly, the image reading apparatus 100b and the image reading apparatus 100c form images corresponding to the assignment scan data SSD on sheets. Accordingly, the image reading apparatus 100b and the image reading apparatus 100c can form assignment sheets SSb and SSc. Typically, the assignment sheets SSa to SSc of the image reading apparatuses 100a to 100c are the same.

Thereafter, typically, the operator A writes an answer in the assignment sheet SSa. Accordingly, the assignment sheet SSa becomes an answer sheet RSa.

Similarly, the operator B writes an answer in the assignment sheet SSb. Accordingly, the assignment sheet SSb becomes an answer sheet RSb. The operator C writes an answer in the assignment sheet SSc. Accordingly, the assignment sheet SSc becomes an answer sheet RSc.

Figure 17A:
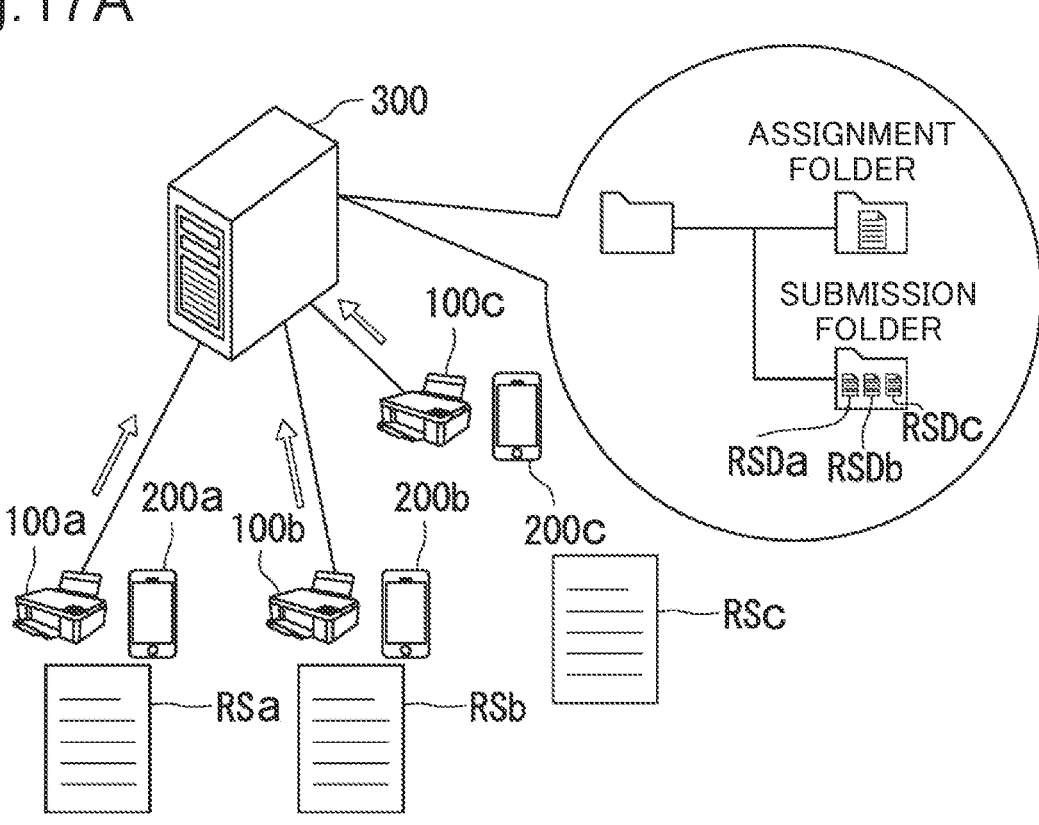
FIGS. 17A, and 17B are schematic explanatory views of uploading of scan data and downloading of print data utilizing the shared folder in the data communication system of the present embodiment.

As shown in FIG. 17A, the image reading apparatus 100a generates answer scan data RSDa obtained by scanning the answer sheet RSa and transmits it to the data management apparatus 300. At this time, the image reading apparatus 100a designates a submission folder of the hierarchical structure in the data management apparatus 300 for storing the answer scan data RSDa and transmits the answer scan data RSDa. Accordingly, the answer scan data RSDa is uploaded on the submission folder of the hierarchical structure in the data management apparatus 300 from the image reading apparatus 100a.

Similarly, the image reading apparatus 100b generates answer scan data RSDb obtained by scanning the answer sheet RSb and transmits it to the data management apparatus 300. At this time, the image reading apparatus 100b designates the submission folder of the hierarchical structure in the data management apparatus 300 for storing the answer scan data RSDb and transmits the answer scan data RSDb. Accordingly, the answer scan data RSDb is uploaded on the submission folder of the hierarchical structure in the data management apparatus 300 from the image reading apparatus 100b.

Similarly, the image reading apparatus 100c generates answer scan data RSDc obtained by scanning the answer sheet RSc and transmits it to the data management apparatus 300. At this time, the image reading apparatus 100c designates the submission folder of the hierarchical structure in the data management apparatus 300 for storing the answer scan data RSDc and transmits the answer scan data RSDc. Accordingly, the answer scan data RSDc is uploaded on the submission folder of the hierarchical structure in the data management apparatus 300 from the image reading apparatus 100c.

When operator information of the operator is registered in the image reading apparatus 100, the image reading apparatus 100 may set the data name of answer scan data obtained by scanning an answer sheet to a name including the registered operator information. Typically, an operator is an answerer, and operator information is the name of the answerer. Accordingly, the operator T can easily know which answerer has submitted the submitted answer sheet.

Figure 17B:
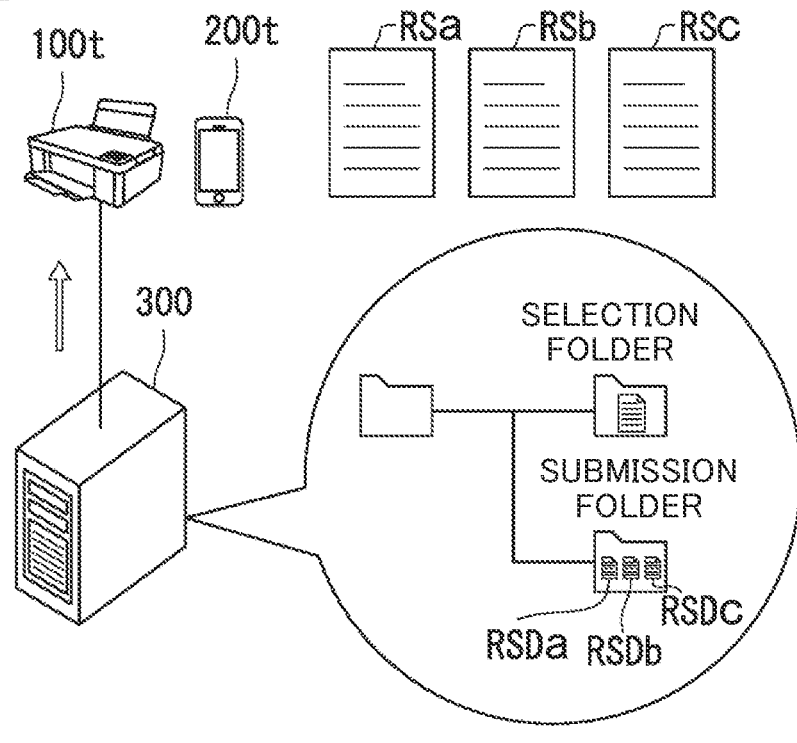

As shown in FIG. 17B, the image reading apparatus 100t forms images on sheets by reading the answer scan data RSDa to the answer scan data RSDc from the submission folder in the data management apparatus 300. Accordingly, the answer scan data RSDa to the answer scan data RSDc are downloaded to the image reading apparatus 100t from the submission folder of the hierarchical structure of folders of the data management apparatus 300. The image reading apparatus 100t forms images corresponding to the answer scan data RSDa to the answer scan data RSDc on sheets. Accordingly, the image reading apparatus 100t can form answer sheets RSa to RSc.

Figure 18A:
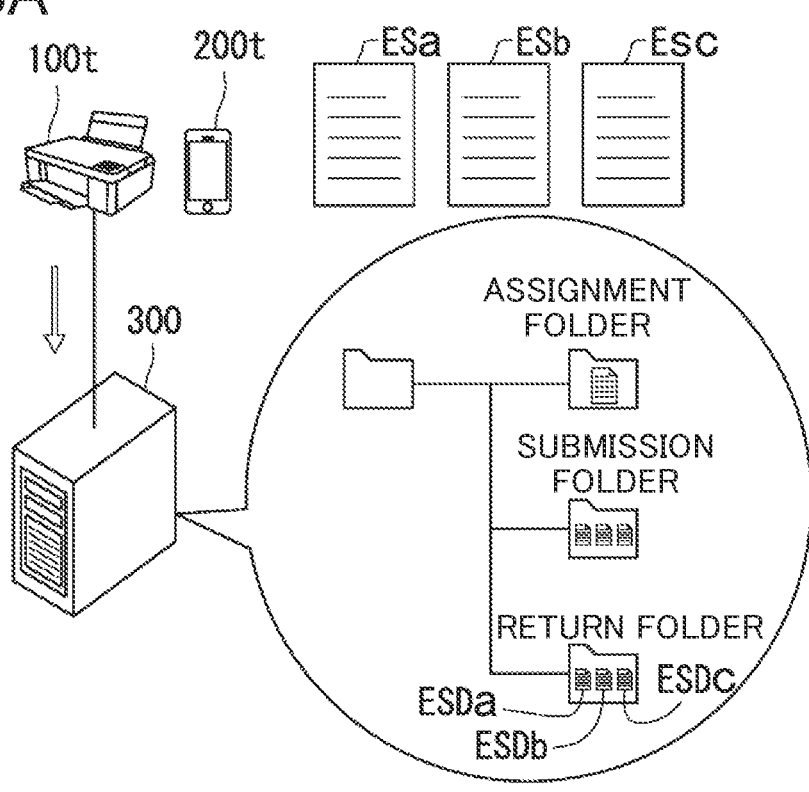
FIGS. 18A and 18B are schematic explanatory views of uploading of scan data and downloading of print data utilizing the shared folder in the data communication system of the present embodiment.

Thereafter, typically, as shown in FIG. 18A, the operator T writes evaluations on the answer sheets RSa to RSc. For example, the operator T marks the answer sheets RSa to RSc. Accordingly, the answer sheets RSa to RSc become evaluation result sheets ESa to ESc. The image reading apparatus 100t generates evaluation result scan data ESDa to evaluation result scan data ESDc by scanning the evaluation result sheets ESa to ESc. Thereafter, the image reading apparatus 100t transmits the evaluation result scan data ESDa to the evaluation result scan data ESDc to the data management apparatus 300.

Here, in addition to the assignment folder and the submission folder, the data management apparatus 300 has a return folder as a shared folder. The return folder is used for returning the evaluation result sheets ESa to ESc. The return folder may be created in the data management apparatus 300 using the image reading apparatus 100t or the information processing terminal 200t.

The image reading apparatus 100t transmits the evaluation result scan data ESDa to the evaluation result scan data ESDc to the data management apparatus 300 together with shared folder designation information designating a return folder.

The data management apparatus 300 receives the evaluation result scan data ESDa to the evaluation result scan data ESDc together with shared folder designation information designating a return folder. The data management apparatus 300 stores the evaluation result scan data ESDa to the evaluation result scan data ESDc in the return folder of the hierarchical structure. Accordingly, the evaluation result scan data ESDa to the evaluation result scan data ESDc are uploaded on the return folder of the hierarchical structure in the data management apparatus 300.

Figure 18B:
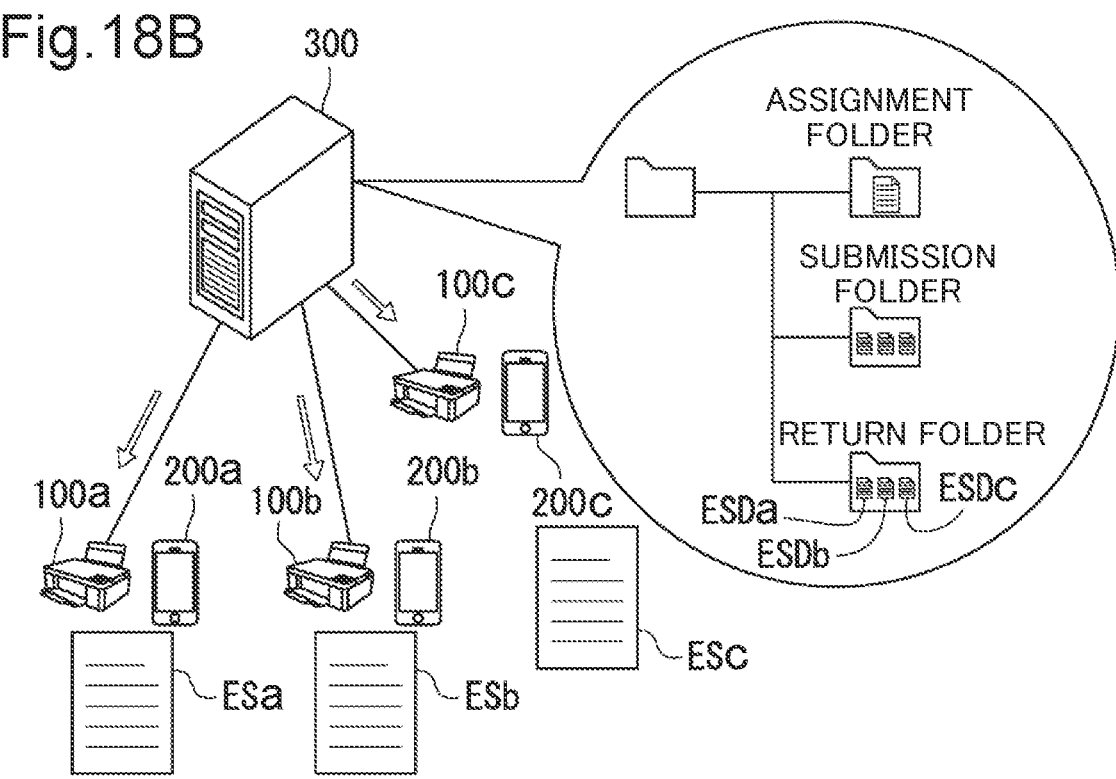

As shown in FIG. 18B, the image reading apparatuses 100a to 100c read and receive the evaluation result scan data ESDa to the evaluation result scan data ESDc from the return folder of the hierarchical structure in the data management apparatus 300. Accordingly, the evaluation result scan data ESDa to the evaluation result scan data ESDc are downloaded to the image reading apparatuses 100a to 100c from the return folder of the hierarchical structure of folders of the data management apparatus 300.

The image reading apparatus 100a forms an image corresponding to the evaluation result scan data ESDa on a sheet. Accordingly, the image reading apparatus 100a can form the evaluation result sheet ESa.

Similarly, the image reading apparatus 100b and the image reading apparatus 100c form images corresponding to the evaluation result scan data ESDb and the evaluation result scan data ESDc on sheets. Accordingly, the image reading apparatus 100b and the image reading apparatus 100c can form the assignment sheets ESb and ESc.

As above, according to the present embodiment, distribution of assignments, collection of answers, evaluation of answers, and transmission of evaluation results can be favorably executed.

Hereinabove, the embodiment of the present invention has been described with reference to the drawings. However, the present invention is not limited to the foregoing embodiment and can be performed in various forms within a range not departing from the gist thereof. In addition, various inventions can be formed by suitably combining a plurality of constituent elements disclosed in the foregoing embodiment. For example, some constituent elements may be deleted from all of the constituent elements described in the embodiment. Moreover, constituent elements from different embodiments may be suitably combined. In order to facilitate the understanding, the drawings schematically show each of the constituent elements independently, and the thickness, the length, the number, the interval, and the like of each of the constituent elements shown in the diagrams may differ from actual values for the convenience of creation of drawings. In addition, the material, the shape, the dimensions, and the like of each of the constituent elements described in the foregoing embodiment are merely examples and are not particularly limited, and various changes can be made within a range not substantially departing from the effects of the present invention.

INDUSTRIAL APPLICABILITY

The present invention is favorably used for an image reading apparatus and a data communication system.

The invention claimed is:

1. A data communication system including a data management apparatus and a plurality of image reading apparatuses, wherein the data management apparatus comprises:

a first communication device capable of communicating with the plurality of image reading apparatuses via a network;

a first storage device storing a plurality of shared folders managed in a hierarchical structure and shared among the plurality of image reading apparatuses; and a first controller including a processor and, through the processor executing a control program, storing, when the first communication device receives scan data and folder designation information from any of the plurality of image reading apparatuses, the scan data in the shared folder designated by the folder designation information, and each of the plurality of image reading apparatuses comprises:

a reading device generating scan data by reading a sheet;

a second communication device capable of communicating with the data management apparatus via a network;

a second storage device;

a recognition device recognizing character data included in the scan data;

a display device; and a second controller including a processor and, through the processor executing a control program, storing, before generating the scan data, predetermined designation character data and identification information indicating one of the plurality of shared folders in association with each other in the second storage device;

setting folder designation information such that a shared folder indicated by the identification information associated with the designation character data in the second storage device is designated when character data recognized by the recognition device includes the designation character data, and causing the display device to display a screen for notifying an operator the shared folder designated by the folder designation information;

causing the display device to display a screen for requesting the operator to designate one of the plurality of shared folders when the character data recognized by the recognition device does not include the designation character data; and causing the second communication device to transmit the scan data and the folder designation information to the data management apparatus.

2. The data communication system according to claim 1 further comprising:

an operation device to which an instruction of an operator is input, wherein the second controller:

causes the display device to display the screen indicating the hierarchical structure of the plurality of shared folders in the data management apparatus; and receives, through the operation device, an operation of designating one of the plurality of shared folders from the hierarchical structure of the plurality of shared folders displayed in the display device.

3. The data communication system according to claim 2, wherein the second controller:

causes the display device to display data included in the shared folder of the data management apparatus, receives, through the operation device, an operation of designating the data displayed in the display device, and causes the communication device to instruct the data management apparatus such that the data management apparatus reads the data from the shared folder in the data management apparatus.

4. The data communication system according to claim 1 further comprising:

a forming device forming an image on a sheet in accordance with print data received from the data management apparatus.

5. The data communication system according to claim 1, wherein the second controller causes, when the communication device receives image size designation information designating an image size from the data management apparatus and a size of a sheet to be scanned accords with the image size designated in the image size designation information, the reading device to read the sheet.

6. The data communication system according to claim 1, wherein the second controller:

causes the second storage device to store image size designation information designating an image size; and causes, when a size of a sheet to be scanned accords with the image size designated in the image size designation information, the reading device to read the sheet.

7. The data communication system according to claim 6, wherein the second controller causes, when the size of the sheet to be scanned differs from the size designated in image size designation information, the reading device not to read the sheet, and causes the display device to display that the size of the sheet differs.

8. The data communication system according to claim 1, wherein the second controller converts, when the second communication device receives image size designation information designating an image size from the data management apparatus and a size of a sheet to be scanned is different from the image size designated in the image size designation information, scan data generated by causing the reading device to read the sheet into data including the image size designated by the image size designation information.

9. The data communication system according to claim 1, wherein the second controller:

causes the second storage device to store image size designation information designating an image size; and converts, when a size of a sheet to be scanned is different from the image size designated in the image size designation information, scan data generated by causing the reading device to read the sheet into data including the image size designated by the image size designation information stored in the second storage device.

10. A data communication system including a data management apparatus and a plurality of image processing apparatuses, wherein the data management apparatus comprises:

a first communication device capable of communicating with the plurality of image processing apparatuses via a network;

a first storage device storing a plurality of shared folders managed in a hierarchical structure and shared among the plurality of image processing apparatuses; and a first controller including a processor and, through the processor executing a control program, storing, when the first communication device receives scan data and folder designation information from any of the plurality of image processing apparatuses, the scan data in the shared folder designated by the folder designation information, and each of the plurality of image processing apparatuses comprises:

a second communication device capable of communicating with the data management apparatus via a network;

a second storage device;

a recognition device recognizing character data included in scan data;

a display device; and a second controller including a processor and, through the processor executing a control program, storing, before generating the scan data, predetermined designation character data and identification information indicating one of the plurality of shared folders in association with each other in the second storage device;

setting folder designation information such that a shared folder indicated by the identification information associated with the designation character data in the second storage device is designated when character data recognized by the recognition device includes the designation character data, and causing the display device to display a screen for notifying an operator the shared folder designated by the folder designation information;

causing the display device to display a screen for requesting the operator to designate one of the plurality of shared folders when the character data recognized by the recognition device does not include the designation character data; and causing the second communication device to transmit the scan data and the folder designation information to the data management apparatus.

* * * * *